(12) United States Patent
Cui et al.

(10) Patent No.: US 12,463,772 B2
(45) Date of Patent: Nov. 4, 2025

(54) SYSTEMS, METHODS, AND DEVICES FOR SCHEDULING RESTRICTIONS BASED ON NEEDFORGAP CAPABILITIES OF USER EQUIPMENT

(71) Applicant: Apple Inc., Cupertino, CA (US)

(72) Inventors: Jie Cui, San Jose, CA (US); Dawei Zhang, Saratoga, CA (US); Haitong Sun, Cupertino, CA (US); Hong He, San Jose, CA (US); Huaning Niu, San Jose, CA (US); Manasa Raghavan, Sunnyvale, CA (US); Qiming Li, Beijing (CN); Xiang Chen, Campbell, CA (US); Yang Tang, San Jose, CA (US); Yushu Zhang, Beijing (CN)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 17/773,660

(22) PCT Filed: Aug. 6, 2021

(86) PCT No.: PCT/CN2021/111238
§ 371 (c)(1),
(2) Date: May 2, 2022

(87) PCT Pub. No.: WO2023/010543
PCT Pub. Date: Feb. 9, 2023

(65) Prior Publication Data
US 2024/0178962 A1 May 30, 2024

(51) Int. Cl.
*H04L 5/00* (2006.01)
(52) U.S. Cl.
CPC ............ *H04L 5/005* (2013.01); *H04L 5/0094* (2013.01)

(58) Field of Classification Search
CPC ..... H04B 17/30; H04L 5/0035; H04L 5/0044; H04L 5/0048; H04L 5/0094; H04L 5/0098; H04L 5/0092; H04W 24/10
(Continued)

(56) References Cited

U.S. PATENT DOCUMENTS

2020/0245341 A1   7/2020  Wu et al.
2021/0083730 A1*  3/2021  Hwang ................ H04L 5/0092
(Continued)

FOREIGN PATENT DOCUMENTS

CN   110475280 A   11/2019
CN   113170378 A    7/2021

OTHER PUBLICATIONS

Introduction of inter-frequency measurement without gap, R2-2006262, 3GPP (Year: 2000).*
(Continued)

*Primary Examiner* — Harun Chowdhury
(74) *Attorney, Agent, or Firm* — Eschweiler & Potashnik, LLC; Ningjiao Zhang

(57) ABSTRACT

A user equipment (UE) may support concurrent synchronization signal block (SSB) inter-frequency measurement without a measurement gap (MG). The UE may also, or alternatively, support concurrent SSB inter-frequency measurement in intra-band scenarios (e.g., where a target inter-frequency cell and serving cell are on the same band) and/or inter-band scenarios (e.g., where a target inter-frequency cell and serving cell are on the same band). The UE may report concurrent SSB based inter-frequency measurement as a NEEDFORGAP information element (IE), which may include one or more of a variety of parameters regarding UE measurement capabilities. Scheduling restrictions (e.g., restrictions to downlink and uplink communications) are also enabled based on UE measurement capabilities, includ-
(Continued)

ing scheduling restriction for frequency range 1 (FR1), frequency range 2 (FR2), and cross frequency range scenarios.

16 Claims, 15 Drawing Sheets

(58) Field of Classification Search
USPC .......................................... 370/252, 329, 331
See application file for complete search history.

(56) References Cited

U.S. PATENT DOCUMENTS

| | | | |
|---|---|---|---|
| 2023/0088518 A1* | 3/2023 | Hu ........................ | H04B 17/30 370/252 |
| 2023/0188281 A1* | 6/2023 | Yang .................... | H04L 5/0098 370/329 |

OTHER PUBLICATIONS

3rd Generation Partnership Project; Technical Specification Group Radio Access Network; NR; Requirements for support of radio resource management (Release 17); 3GPP TS 38.133 V17.2.0 (Jun. 2021).
3rd Generation Partnership Project; Technical Specification Group Radio Access Network; NR; User Equipment (UE) radio access capabilities (Release 16); 3GPP TS 38.306 V16.5.0 (Jun. 2021).
3rd Generation Partnership Project; Technical Specification Group Radio Access Network; NR; Radio Resource Control (RRC) protocol specification (Release 16); 3GPP TS 38.331 V16.5.0 (Jun. 2021).
WF on NeedForGap measurements; 3GPP TSG-RAN WG4 Meeting #99-e R4-2108039; Electronic meeting, May 19-27, 2021 Agenda item: 5.1.7.3 Document for: Approval.
PCT Search Report dated Apr. 18, 2022 in connection with PCT Application No. PCT/CN2021/111238.
PCT Written Opinion dated Apr. 20, 2022 in connection with PCT Application No. PCT/CN2021/111238.
CMCC et al; Introduction of inter-frequency measurement without gap; 3GPP TSG-RAN WG2; Meeting #110 electronic; R2-2006262; Jun. 6, 2020.
European Extended Search Report dated Apr. 11, 2025 in connection with Application No. 21952417.0.
Apple; "Email discussion 1,11 Inv. summary for [95e][224] NR_RRM_Enh_RRM_3"; 3GPP TSG-RAN WG4 Meeting #95-e; R4-2009036; Jun. 10, 2020.
Intel Corporation; "Release-16 UE 1,11 capabilities based on updated RAN1 and RAN4 feature lists"; 3GPP TSG RAN WG2 Meeting #113e; R2-2102130; Mar. 3, 2021.

* cited by examiner

| CONFIGURATION 1: SCHEDULING RESTRICTION FOR FR1 INTER-FREQUENCY MEASUREMENT WITHOUT MG ||
|---|---|
| UE CAPABILITY 1.1 | NO SUPPORT FOR MIXED NUMEROLOGY BETWEEN INTER-FREQUENCY SSB OUTSIDE ACTIVE BWP AND SERVING CELL SCS REGARDLESS OF INTRA- AND/OR INTER-BAND SCENARIO |
| SCHEDULING RESTRICTION 1.1 | NO TRANSMISSION ON PUCCH/PUSCH/SRS OR RECEIVE PDCCH/PDSCH/TRS/CSI-RS FOR CQI ON ALL SYMBOLS WITHIN SMTC WINDOW OF INTER-FREQUENCY CELL OR SSB MEASUREMENT. |

FIG. 7

| CONFIGURATION 2: SCHEDULING RESTRICTION FOR FR1 INTER-FREQUENCY MEASUREMENT WITHOUT MG ||
|---|---|
| UE CAPABILITY 2.1 (INTRA-BAND) | NO SUPPORT FOR MIXED NUMEROLOGY BETWEEN INTER-FREQUENCY SSB OUTSIDE UE ACTIVE BWP AND SERVING CELL SCS FOR INTRA-BAND SCENARIO |
| SCHEDULING RESTRICTION 2.1 | NO COMMUNICATION ON PUCCH/PUSCH/SRS OR PDCCH/PDSCH/TRS/CSI-RS FOR CQI ON SYMBOLS WITHIN SMTC WINDOW OF INTER-FREQUENCY CELL OR SSB MEASUREMENT. |
| UE CAPABILITY 2.2 (INTER-BAND) | NO SUPPORT FOR MIXED NUMEROLOGY BETWEEN INTER-FREQUENCY SSB OUTSIDE UE ACTIVE BWP AND SERVING CELL SCS FOR INTER-BAND SCENARIO |
| SCHEDULING RESTRICTION 2.2 | NO SCHEDULING REDIRECTION SHALL BE APPLIED TO TRANSMIT PUCCH/PUSCH/SRS OR RECEIVE PDCCH/PDSCH/TRS/CSI-RS FOR CQI ON SYMBOLS WITHIN SMTC WINDOW OF INTER-FREQUENCY CELL OR SSB MEASUREMENT |

*FIG. 8*

| CONFIGURATION 3: SCHEDULING RESTRICTION FOR FR1 INTER-FREQUENCY MEASUREMENT WITHOUT MG | |
|---|---|
| UE CAPABILITY 3.1 | UE MAY DETERMINE INTER-FREQUENCY CELL TIMING AND NO SUPPORT FOR MIXED NUMEROLOGY BETWEEN INTER-FREQUENCY SSB OUTSIDE ACTIVE BWP AND SERVING CELL SCS (REGARDLESS OF INTRA-BAND AND/OR INTER-BAND SCENARIO) |
| SCHEDULING RESTRICTION 3.1 | LIMITED UPLINK/DOWNLINK COMMUNICATION ON SSB SYMBOLS MEASURED AND ONE OR MORE DATA SYMBOLS BEFORE AND AFTER SSB SYMBOLS MEASURED (AND, OPTIONALLY RSSI SYMBOLS WITHIN SMTC WINDOW DURATION |
| UE CAPABILITY 3.2 | UE UNABLE TO DETERMINE INTER-FREQUENCY CELL TIMING AND NO SUPPORT FOR MIXED NUMEROLOGY BETWEEN INTER-FREQUENCY SSB OUTSIDE UE ACTIVE BWP AND SERVING CELL SCS (REGARDLESS OF INTRA-BAND CASE AND/OR INTER-BAND SCENARIO) |
| SCHEDULING RESTRICTION 3.2 | NO UE COMMUNICATION ON PUCCH/PUSCH/SRS OR PDCCH/PDSCH/TRS/CSI-RS FOR CQI ON ALL SYMBOLS WITHIN SMTC WINDOW DURATION OF INTER-FREQUENCY CELL OR SSB MEASUREMENT |

*FIG. 9*

| CONFIGURATION 4: SCHEDULING RESTRICTION FOR FR1 INTER-FREQUENCY MEASUREMENT WITHOUT MG | |
|---|---|
| UE CAPABILITY 4.1 | UE MAY DETERMINE INTER-FREQUENCY CELL TIMING AND INDICATE NO SUPPORT FOR MIXED NUMEROLOGY BETWEEN INTER-FREQUENCY SSB OUTSIDE ACTIVE BWP AND SERVING CELL SCS FOR INTRA-BAND SCENARIO |
| SCHEDULING RESTRICTION 4.1 | LIMITED UPLINK/DOWNLINK COMMUNICATION ON SSB SYMBOLS MEASURED AND ONE OR MORE DATA SYMBOLS BEFORE AND AFTER SSB SYMBOLS MEASURED (AND, OPTIONALLY RSSI SYMBOLS WITHIN SMTC WINDOW DURATION |
| UE CAPABILITY 4.2 | UE UNABLE TO DETERMINE INTER-FREQUENCY CELL TIMING AND NO SUPPORT FOR MIXED NUMEROLOGY BETWEEN INTER-FREQUENCY SSB OUTSIDE UE ACTIVE BWP AND SERVING CELL SCS FOR INTRA-BAND SCENARIO |
| SCHEDULING RESTRICTION 4.2 | NO UE COMMUNICATION ON PUCCH/PUSCH/SRS OR PDCCH/PDSCH/TRS/CSI-RS FOR CQI ON ALL SYMBOLS WITHIN SMTC WINDOW DURATION OF INTER-FREQUENCY CELL OR SSB MEASUREMENT |
| UE CAPABILITY 4.3 | INTER-FREQUENCY CELL TIMING KNOWN BY UE AND NO SUPPORT FOR MIXED NUMEROLOGY BETWEEN INTER-FREQUENCY SSB OUTSIDE ACTIVE BWP AND SERVING CELL SCS FOR INTER-BAND SCENARIO |
| SCHEDULING RESTRICTION 4.3 | NO SCHEDULING REDIRECTION TO TRANSMIT PUCCH/PUSCH/SRS OR RECEIVE PDCCH/PDSCH/TRS/CSI-RS FOR CQI ON ALL SYMBOLS WITHIN SMTC WINDOW DURATION OF INTER-FREQUENCY CELL OR SSB MEASUREMENT |

*FIG. 10*

| CONFIGURATION 5: SCHEDULING RESTRICTION FOR FR2 INTER-FREQUENCY MEASUREMENT WITHOUT MG (MIXED NUMEROLOGY AND RX BEAM SWEEPING DETERMINE SCHEDULING RESTRICTION) ||
|---|---|
| UE CAPABILITY 5.1 | IN AN INTRA-BAND INTER-FREQUENCY SCENARIO (I.E., SERVING CELL AND TARGET INTER-FREQUENCY CELL ARE ON SAME BAND UE CAPABILITY MAY BE NOT APPLICABLE, |
| SCHEDULING RESTRICTION 5.1 | NO TRANSMISSION ON PUCCH/PUSCH/SRS OR RECEIVE PDCCH/PDSCH/TRS/CSI-RS FOR CQI ON ALL SYMBOLS WITHIN SMTC WINDOW OF INTER-FREQUENCY CELL OR SSB MEASUREMENT. |
| UE CAPABILITY 5.2 | UE MAY DETERMINE INTER-FREQUENCY CELL TIMING |
| SCHEDULING RESTRICTION 5.2 | LIMITED UPLINK/DOWNLINK COMMUNICATION ON SSB SYMBOLS MEASURED AND ONE OR MORE DATA SYMBOLS BEFORE AND AFTER SSB SYMBOLS MEASURED (AND, OPTIONALLY RSSI SYMBOLS WITHIN SMTC WINDOW DURATION |

*FIG. 11*

| CONFIGURATION 7: SCHEDULING RESTRICTION CROSS FR ON INTER MEASUREMENT WITHOUT MG ||
|---|---|
| UE CAPABILITY 7.1 | UE SUPPORTS CROSS FR INTER-FREQUENCY MEASUREMENT WITHOUT MG (E.G., SERVING CELL ON ONE FR AND TARGET INTER FREQUENCY CELL ON ANOTHER FR |
| SCHEDULING RESTRICTION 7.1 | NO SCHEDULING REDIRECTION TO TRANSMIT PUCCH/PUSCH/SRS OR RECEIVE PDCCH/PDSCH/TRS/CSI-RS FOR CQI ON ALL SYMBOLS WITHIN SMTC WINDOW DURATION OF INTER-FREQUENCY CELL OR SSB MEASUREMENT |

*FIG. 13*

SYSTEMS, METHODS, AND DEVICES FOR SCHEDULING RESTRICTIONS BASED ON NEEDFORGAP CAPABILITIES OF USER EQUIPMENT

This application is a National Phase entry application of International Patent Application No. PCT/CN2021/111238 filed Aug. 6, 2021, entitled "SYSTEMS, METHODS, AND DEVICES FOR SCHEDULING RESTRICTIONS BASED ON NEED FOR GAP CAPABILITIES OF USER EQUIPMENT", the contents of which are herein incorporated by reference in their entirety.

FIELD

This disclosure relates to wireless communication networks including techniques for wireless synchronization.

BACKGROUND

As the number of mobile devices within wireless networks, and the demand for mobile data traffic, continue to increase, changes are made to system requirements and architectures to better address current and anticipated demands. For example, some wireless communication networks may be developed to implement fifth generation (5G) or new radio (NR) technology, sixth generation (6G) technology, and so on. An aspect of such technology includes addressing how radio frequencies and/or other wireless resources may be arranged, allocated, etc., for communications between wireless devices, such as user equipment (UE) device, base stations, etc. Additionally, an aspect of allocating resources may include synchronizing wireless devices to communicate with one another, which may involve a period of signal measurement that is sometimes referred to as a measurement gap.

BRIEF DESCRIPTION OF THE DRAWINGS

The present disclosure will be readily understood and enabled by the detailed description and accompanying figures of the drawings. Like reference numerals may designate like features and structural elements. Figures and corresponding descriptions are provided as non-limiting examples of aspects, implementations, etc., of the present disclosure, and references to "an" or "one" aspect, implementation, etc., may not necessarily refer to the same aspect, implementation, etc., and may mean at least one, one or more, etc.

FIGS. 7-10 are diagrams of examples of UE capabilities and corresponding scheduling restrictions for frequency range 1 (FR1) communication scenarios according to one or more implementations described herein.

FIGS. 11-12 are diagrams of examples of UE capabilities and corresponding scheduling restrictions for frequency range 2 (FR2) communication scenarios according to one or more implementations described herein.

FIG. 13 is a diagram of an example of UE capabilities and corresponding scheduling restrictions for cross FR inter-frequency measurements without measurement gaps (MGs) according to one or more implementations described herein.

DETAILED DESCRIPTION

Figure 1:
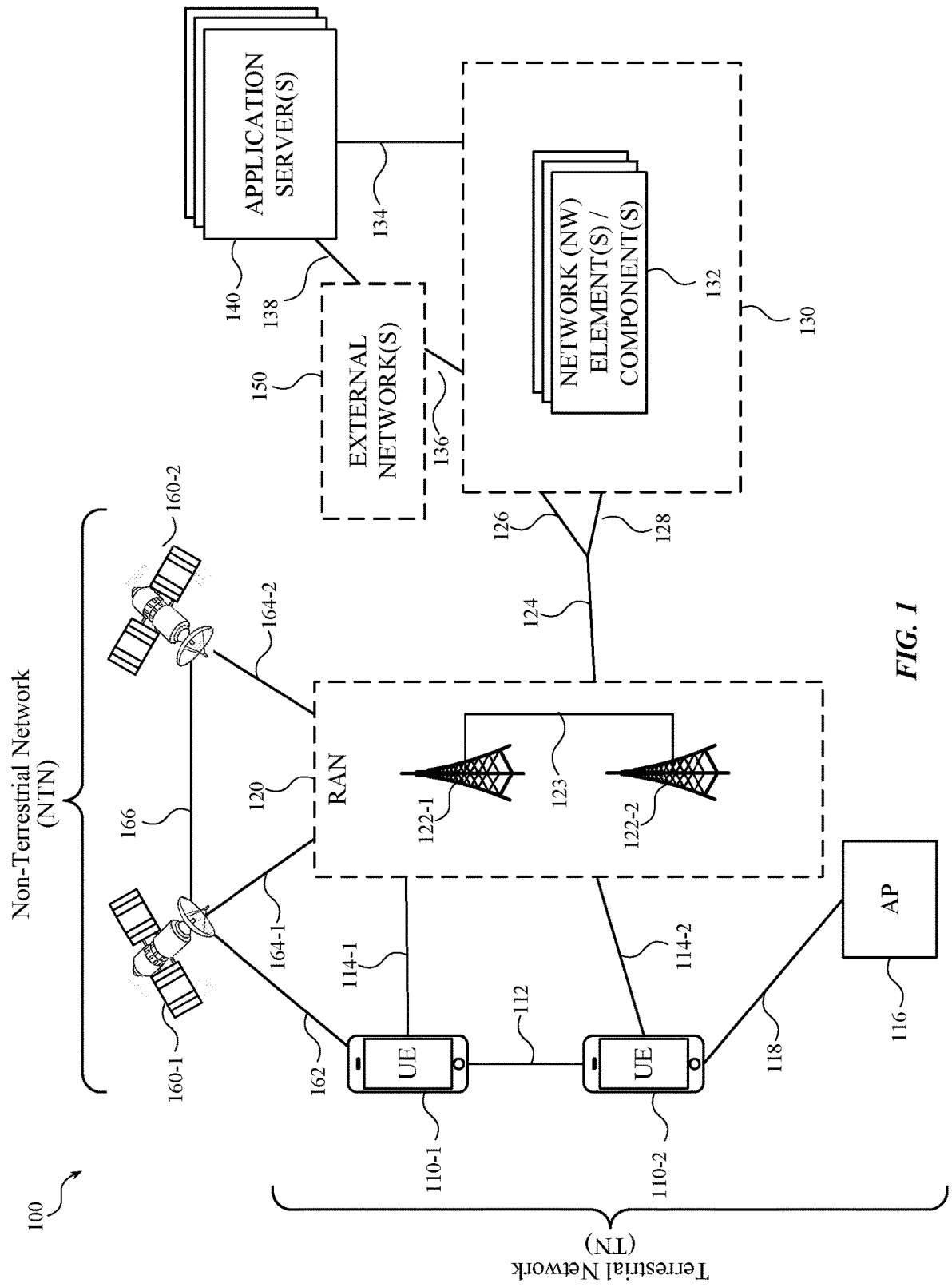
FIG. 1 is a diagram of an example network according to one or more implementations described herein.

The following detailed description refers to the accompanying drawings. Like reference numbers in different drawings may identify the same or similar features, elements, operations, etc. Additionally, the present disclosure is not limited to the following description as other implementations may be utilized, and structural or logical changes made, without departing from the scope of the present disclosure.

Wireless communication networks may include user equipment (UEs), base stations, and/or other types of wireless devices capable of communicating with one another. An important aspect of mobile wireless networks is enabling wireless devices to synchronize with one another. In 4th Generation (4G) wireless communication networks may implement an approach where reference signals are spread over an entire wireless spectrum for channel estimation. By contrast, 5th Generation (5G) (or New Radio (NR)) wireless communication networks may broadcast a minimum number of cell-specific signals with a known sequence that can be measured by UEs. This 5G signal may include a synchronization signal block (SSB), which may occupy 240 subcarriers (of the frequency domain) and 4 symbols (of the time domain). The SSB may include a primary synchronization signal (PSS), a secondary synchronization signal (SSS), and a physical broadcast channel (PBCH). Additionally, SSBs may be transmitted periodically from each cell, which may involve one of a set of pre-designated or pre-configured transmission patters.

In a 5G network, for procedures such as handover to a target cell, adding a carrier component (CC), etc., a UE may measure the serving cell and target cell signal strength (e.g., a reference signal received power (RSRP)) or signal quality matrix (e.g., reference signal received quality (RSRQ)). Doing so may, for example, enable the measurement process to be executed appropriately, maintaining the radio link quality. Further, 5G networks may include an SSB-based radio resource management (RRM) measurement timing configuration (SMTC) window (called SMTC window) that may notify a UE regarding measurement periodicity and timings of SSBs that the UE may use for measurements. The SMTC window periodicity can be set in the same range of the SSB, and window duration can be set according to the number of SSBs transmitted on the cell being measured.

In a 5G network, a UE may signal, to a base station, NeedForGap information, which may include one or more types of a variety of information relating to a capability of the UE to receive, SSBs, measure SSBs, and respond to the network accordingly. For example, NeedForGap information (e.g., nr-NeedForGap-Reporting-r16) may indicate whether the UE supports reporting the measurement gap requirement information for an NR target. NeedForGap information (e.g., intraFreq-needForGap) may indicate measurement gap requirement information for NR intra-frequency measurement. NeedForGap information (e.g., interFreq-needForGap) may indicate measurement gap requirement information for NR inter-frequency measurement.

NeedForGap information (e.g., servCellId) may indicate a serving cell which contains the target SSB (associated with the initial DL BWP) to be measured. NeedForGap information (e.g., gapIndicationIntra) may indicate whether a measurement gap is required for the UE to perform intra-frequency SSB based measurements on a concerned serving cell. A value of "gap" may indicate that a measurement gap is needed if any of the UE configured bandwidth parts (BWPs) do not contain the frequency domain resources of the SSB associated to the initial downlink (DL) BWP. By contrast, a value of "no-gap" may indicate a measurement gap is not needed to measure the SSB associated to the initial DL BWP for all configured BWPs, regardless of whether the SSB is within the configured BWP. NeedForGap information (e.g., bandNR) may indicate an NR target band to be measured. NeedForGap information (e.g., gapIndication) may indicate whether a measurement gap is required for the UE to perform SSB based measurements on a concerned NR target band. The UE may determine this information based on radio resource control (RRC) information (e.g., a RRCReconfiguration message or RRCResume message that triggers this response). Additionally, a value of "gap" may indicate that a measurement gap is used, while a value of "no-gap" may indicate a measurement gap is not used.

While some aspects of enabling UEs to use NeedForGap information to receive, measure, and report back on SSBs are defined, other aspects of doing so remain undeveloped and incomplete. For instance, existing techniques may provide for UEs to communicate NeedForGap information of (e.g., interFrequencyMeas-NoGap) to indicate whether the UE can perform inter-frequency SSB based measurements without measurement gaps (MGs) when the SSB is contained in an active BWP used by the UE. Existing techniques do not adequately provide for other scenarios, such as those regarding whether the UE can perform inter-frequency SSB based measurements without measurement gaps when the SSB is not contained in an active BWP used by the UE (e.g., when different or mixed numerologies are used for inter-frequency SSB based measurements). Existing techniques also do not provide for scenarios involving mixed numerologies when frequency range 1 (FR1) inter-frequency without measurement gap (MG) is used, when beam sweeping scenarios when frequency range 2 (FR2) inter-frequency without MG is used, and the scheduling restrictions for such scenarios (e.g., restrictions on whether the UE is to be expected to receive or transmit information, during an SMTC and/or SSB measurement), based on UE capabilities for inter-frequency scenarios without a measuring gap.

FR1, as described herein, may refer to a radio frequency range of 410 MHz-7125 MHz. FR2, as described herein, may refer to a radio frequency range of 24250 MHz-52600 MHz (sometimes referred to as the millimeter wave range). Additionally, inter-frequency, as described herein, may refer to two frequency carriers in same frequency band in same frequency range or in different frequency bands in same or different frequency ranges (e.g., FR1 and FR2). By contrast, intra-frequency, as described herein, may refer to frequency carrier in same frequency bands within the same frequency range (e.g., within FR1 or FR2). Beam sweeping, as described herein, may refer to a technique to train receive beams in all predefined directions in a burst in a regular interval. For example, a first step in mobile terminal attach procedure may include initial access, which may include synchronizing with a system and receiving a minimum system information broadcast. So, a SSB may carry a PSS, SSS and PBCH, and the broadcast may be repeated in predefined directions (beams) in specified time domain windows called a SS burst (or SSB burst), which will be repeated according to a specified periodicity.

Techniques, described herein, may enable a UE to support mixed numerologies for inter-frequency SSB based measurements. For example, a UE may use different radio frequency (RF) chains (e.g., different bandwidths) to perform concurrent SSB measurements. In another example, a UE may expand a currently active RF chain (e.g., bandwidth) to include an additional SSB burst and thereby perform concurrent SSB measurements within the same band. The techniques described herein may also provide appropriate scheduling restrictions for different types of UE capabilities and scenarios. Examples of such UE capabilities and scenarios may include, or be based on, scenarios in which a UE cannot support mixed numerology between inter-frequency SSBs outside a UE active BWP, whether inter-frequency cell timing can be known to the UE or aligned with serving cell, whether the UE is operating in FR1, FR2, or a combination thereof, whether mixed numerology and beam sweeping is involved, etc. Examples, implementations, features, and details of these techniques and solutions are described below with reference to the Figures.

FIG. 1 is an example network 100 according to one or more implementations described herein. Example network 100 may include UEs 110-1, 110-2, etc. (referred to collectively as "UEs 110" and individually as "UE 110"), a radio access network (RAN) 120, a core network (CN) 130, application servers 140, external networks 150, and satellites 160-1, 160-2, etc. (referred to collectively as "satellites 160" and individually as "satellite 160"). As shown, network 100 may include a non-terrestrial network (NTN) comprising one or more satellites 160 (e.g., of a global navigation satellite system (GNSS)) in communication with UEs 110 and RAN 120.

The systems and devices of example network 100 may operate in accordance with one or more communication standards, such as 2nd generation (2G), 3rd generation (3G), 4th generation (4G) (e.g., long-term evolution (LTE)), and/or 5th generation (5G) (e.g., new radio (NR)) communication standards of the 3rd generation partnership project (3GPP). Additionally, or alternatively, one or more of the systems and devices of example network 100 may operate in accordance with other communication standards and protocols discussed herein, including future versions or generations of 3GPP standards (e.g., sixth generation (6G) standards, seventh generation (7G) standards, etc.), institute of electrical and electronics engineers (IEEE) standards (e.g., wireless metropolitan area network (WMAN), worldwide interoperability for microwave access (WiMAX), etc.), and more.

As shown, UEs 110 may include smartphones (e.g., handheld touchscreen mobile computing devices connectable to one or more wireless communication networks). Additionally, or alternatively, UEs 110 may include other types of mobile or non-mobile computing devices capable of wireless communications, such as personal data assistants (PDAs), pagers, laptop computers, desktop computers, wireless handsets, etc. In some implementations, UEs 110 may include internet of things (IoT) devices (or IoT UEs) that may comprise a network access layer designed for low-power IoT applications utilizing short-lived UE connections. Additionally, or alternatively, an IoT UE may utilize one or more types of technologies, such as machine-to-machine (M2M) communications or machine-type communications (MTC) (e.g., to exchanging data with an MTC server or other device via a public land mobile network (PLMN)), proximity-based service (ProSe) or device-to-device (D2D) communications, sensor networks, IoT networks, and more. Depending on the scenario, an M2M or MTC exchange of data may be a machine-initiated exchange, and an IoT network may include interconnecting IoT UEs (which may include uniquely identifiable embedded computing devices within an Internet infrastructure) with short-lived connections. In some scenarios, IoT UEs may execute background applications (e.g., keep-alive messages, status updates, etc.) to facilitate the connections of the IoT network.

UEs 110 may communicate and establish a connection with (e.g., be communicatively coupled) with RAN 120, which may involve one or more wireless channels 114-1 and 114-2, each of which may comprise a physical communications interface/layer. In some implementations, a UE may be configured with dual connectivity (DC) as a multi-radio access technology (multi-RAT) or multi-radio dual connectivity (MR-DC), where a multiple receive and transmit (Rx/Tx) capable UE may use resources provided by different network nodes (e.g., 122-1 and 122-2) that may be connected via non-ideal backhaul (e.g., where one network node provides NR access and the other network node provides either E-UTRA for LTE or NR access for 5G). In such a scenario, one network node may operate as a master node (MN) and the other as the secondary node (SN). The MN and SN may be connected via a network interface, and at least the MN may be connected to the CN 130. Additionally, at least one of the MN or the SN may be operated with shared spectrum channel access, and functions specified for UE 110 can be used for an integrated access and backhaul mobile termination (IAB-MT). Similar for UE 101-110, the IAB-MT may access the network using either one network node or using two different nodes with enhanced dual connectivity (EN-DC) architectures, new radio dual connectivity (NR-DC) architectures, or the like. In some implementations, a base station (as described herein) may be an example of network node 122.

As shown, UE 110 may also, or alternatively, connect to access point (AP) 116 via connection interface 118, which may include an air interface enabling UE 110 to communicatively couple with AP 116. AP 116 may comprise a wireless local area network (WLAN), WLAN node, WLAN termination point, etc. The connection 1207 may comprise a local wireless connection, such as a connection consistent with any IEEE 702.11 protocol, and AP 116 may comprise a wireless fidelity (Wi-Fi®) router or other AP. While not explicitly depicted in FIG. 1, AP 116 may be connected to another network (e.g., the Internet) without connecting to RAN 120 or CN 130. In some scenarios, UE 110, RAN 120, and AP 116 may be configured to utilize LTE-WLAN aggregation (LWA) techniques or LTE WLAN radio level integration with IPsec tunnel (LWIP) techniques. LWA may involve UE 110 in RRC_CONNECTED being configured by RAN 120 to utilize radio resources of LTE and WLAN. LWIP may involve UE 110 using WLAN radio resources (e.g., connection interface 118) via IPsec protocol tunneling to authenticate and encrypt packets (e.g., Internet Protocol (IP) packets) communicated via connection interface 118. IPsec tunneling may include encapsulating the entirety of original IP packets and adding a new packet header, thereby protecting the original header of the IP packets.

RAN 120 may include one or more RAN nodes 122-1 and 122-2 (referred to collectively as RAN nodes 122, and individually as RAN node 122) that enable channels 114-1 and 114-2 to be established between UEs 110 and RAN 120. RAN nodes 122 may include network access points configured to provide radio baseband functions for data and/or voice connectivity between users and the network based on one or more of the communication technologies described herein (e.g., 2G, 3G, 4G, 5G, WiFi, etc.). As examples therefore, a RAN node may be an E-UTRAN Node B (e.g., an enhanced Node B, eNodeB, eNB, 4G base station, etc.), a next generation base station (e.g., a 5G base station, NR base station, next generation eNBs (gNB), etc.). RAN nodes 122 may include a roadside unit (RSU), a transmission reception point (TRxP or TRP), and one or more other types of ground stations (e.g., terrestrial access points). In some scenarios, RAN node 122 may be a dedicated physical device, such as a macrocell base station, and/or a low power (LP) base station for providing femtocells, picocells or other like having smaller coverage areas, smaller user capacity, or higher bandwidth compared to macrocells. As described below, in some implementations, satellites 160 may operate as bases stations (e.g., RAN nodes 122) with respect to UEs 110. As such, references herein to a base station, RAN node 122, etc., may involve implementations where the base station, RAN node 122, etc., is a terrestrial network node and also to implementation where the base station, RAN node 122, etc., is a non-terrestrial network node (e.g., satellite 160).

Some or all of RAN nodes 122 may be implemented as one or more software entities running on server computers as part of a virtual network, which may be referred to as a centralized RAN (CRAN) and/or a virtual baseband unit pool (vBBUP). In these implementations, the CRAN or vBBUP may implement a RAN function split, such as a packet data convergence protocol (PDCP) split wherein RRC and PDCP layers may be operated by the CRAN/vBBUP and other Layer 2 (L2) protocol entities may be operated by individual RAN nodes 122; a media access control (MAC)/physical (PHY) layer split wherein RRC, PDCP, radio link control (RLC), and MAC layers may be operated by the CRAN/vBBUP and the PHY layer may be operated by individual RAN nodes 122; or a "lower PHY" split wherein RRC, PDCP, RLC, MAC layers and upper portions of the PHY layer may be operated by the CRAN/vBBUP and lower portions of the PHY layer may be operated by individual RAN nodes 122. This virtualized framework may allow freed-up processor cores of RAN nodes 122 to perform or execute other virtualized applications.

In some implementations, an individual RAN node 122 may represent individual gNB-distributed units (DUs) connected to a gNB-control unit (CU) via individual F1 interfaces. In such implementations, the gNB-DUs may include one or more remote radio heads or radio frequency (RF) front end modules (RFEMs), and the gNB-CU may be operated by a server (not shown) located in RAN 120 or by a server pool (e.g., a group of servers configured to share resources) in a similar manner as the CRAN/vBBUP. Additionally, or alternatively, one or more of RAN nodes 122 may be next generation eNBs (i.e., gNBs) that may provide evolved universal terrestrial radio access (E-UTRA) user plane and control plane protocol terminations toward UEs 110, and that may be connected to a 5G core network (5GC) 130 via an NG interface.

Any of the RAN nodes 122 may terminate an air interface protocol and may be the first point of contact for UEs 110. In some implementations, any of the RAN nodes 122 may fulfill various logical functions for the RAN 120 including, but not limited to, radio network controller (RNC) functions such as radio bearer management, uplink and downlink dynamic radio resource management and data packet scheduling, and mobility management. UEs 110 may be configured to communicate using orthogonal frequency-division multiplexing (OFDM) communication signals with each other or with any of the RAN nodes 122 over a multicarrier communication channel in accordance with various communication techniques, such as, but not limited to, an OFDMA communication technique (e.g., for downlink communications) or a single carrier frequency-division multiple access (SC-FDMA) communication technique (e.g., for uplink and ProSe or sidelink (SL) communications), although the scope of such implementations may not be limited in this regard. The OFDM signals may comprise a plurality of orthogonal subcarriers.

In some implementations, a downlink resource grid may be used for downlink transmissions from any of the RAN nodes 122 to UEs 110, and uplink transmissions may utilize similar techniques. The grid may be a time-frequency grid (e.g., a resource grid or time-frequency resource grid) that represents the physical resource for downlink in each slot. Such a time-frequency plane representation is a common practice for OFDM systems, which makes it intuitive for radio resource allocation. Each column and each row of the resource grid corresponds to one OFDM symbol and one OFDM subcarrier, respectively. The duration of the resource grid in the time domain corresponds to one slot in a radio frame. The smallest time-frequency unit in a resource grid is denoted as a resource element. Each resource grid comprises resource blocks, which describe the mapping of certain physical channels to resource elements. Each resource block may comprise a collection of resource elements (REs); in the frequency domain, this may represent the smallest quantity of resources that currently may be allocated. There are several different physical downlink channels that are conveyed using such resource blocks.

Further, RAN nodes 122 may be configured to wirelessly communicate with UEs 110, and/or one another, over a licensed medium (also referred to as the "licensed spectrum" and/or the "licensed band"), an unlicensed shared medium (also referred to as the "unlicensed spectrum" and/or the "unlicensed band"), or combination thereof. A licensed spectrum may include channels that operate in the frequency range of approximately 400 MHz to approximately 3.8 GHz, whereas the unlicensed spectrum may include the 5 GHz band. A licensed spectrum may correspond to channels or frequency bands selected, reserved, regulated, etc., for certain types of wireless activity (e.g., wireless telecommunication network activity), whereas an unlicensed spectrum may correspond to one or more frequency bands that are not restricted for certain types of wireless activity. Whether a particular frequency band corresponds to a licensed medium or an unlicensed medium may depend on one or more factors, such as frequency allocations determined by a public-sector organization (e.g., a government agency, regulatory body, etc.) or frequency allocations determined by a private-sector organization involved in developing wireless communication standards and protocols, etc.

To operate in the unlicensed spectrum, UEs 110 and the RAN nodes 122 may operate using licensed assisted access (LAA), eLAA, and/or feLAA mechanisms. In these implementations, UEs 110 and the RAN nodes 122 may perform one or more known medium-sensing operations or carrier-sensing operations in order to determine whether one or more channels in the unlicensed spectrum is unavailable or otherwise occupied prior to transmitting in the unlicensed spectrum. The medium/carrier sensing operations may be performed according to a listen-before-talk (LBT) protocol.

The LAA mechanisms may be built upon carrier aggregation (CA) technologies of LTE-Advanced systems. In CA, each aggregated carrier is referred to as a component carrier (CC). In some cases, individual CCs may have a different bandwidth than other CCs. In time division duplex (TDD) systems, the number of CCs as well as the bandwidths of each CC may be the same for DL and UL. CA also comprises individual serving cells to provide individual CCs. The coverage of the serving cells may differ, for example, because CCs on different frequency bands will experience different pathloss. A primary service cell or PCell may provide a primary component carrier (PCC) for UL and DL, and may handle RRC and non-access stratum (NAS) related activities. The other serving cells are referred to as SCells, and each SCell may provide an individual secondary component carrier (SCC) for UL and DL. The SCCs may be added and removed as required, while changing the PCC may require UE 110 to undergo a handover. In LAA, eLAA, and feLAA, some or all of the SCells may operate in the unlicensed spectrum (referred to as "LAA SCells"), and the LAA SCells are assisted by a PCell operating in the licensed spectrum. When a UE is configured with more than one LAA SCell, the UE may receive UL grants on the configured LAA SCells indicating different PUSCH starting positions within a same subframe.

The PDSCH may carry user data and higher layer signaling to UEs 110. The physical downlink control channel (PDCCH) may carry information about the transport format and resource allocations related to the PDSCH channel, among other things. The PDCCH may also inform UEs 110 about the transport format, resource allocation, and hybrid automatic repeat request (HARQ) information related to the uplink shared channel. Typically, downlink scheduling (e.g., assigning control and shared channel resource blocks to UE 110-2 within a cell) may be performed at any of the RAN nodes 122 based on channel quality information fed back from any of UEs 110. The downlink resource assignment information may be sent on the PDCCH used for (e.g., assigned to) each of UEs 110.

The PDCCH uses control channel elements (CCEs) to convey the control information, wherein a number of CCEs (e.g., 6 or the like) may consists of a resource element groups (REGs), where a REG is defined as a physical resource block (PRB) in an OFDM symbol. Before being mapped to resource elements, the PDCCH complex-valued symbols may first be organized into quadruplets, which may then be permuted using a sub-block interleaver for rate matching, for example. Each PDCCH may be transmitted using one or more of these CCEs, where each CCE may correspond to nine sets of four physical resource elements known as REGs. Four quadrature phase shift keying (QPSK) symbols may be mapped to each REG. The PDCCH may be transmitted using one or more CCEs, depending on the size of the DCI and the channel condition. There may be four or more different PDCCH formats defined in LTE with different numbers of CCEs (e.g., aggregation level, L=1, 2, 4, 8, or 16).

Some implementations may use concepts for resource allocation for control channel information that are an extension of the above-described concepts. For example, some implementations may utilize an extended (E)-PDCCH that uses PDSCH resources for control information transmission. The EPDCCH may be transmitted using one or more ECCEs. Similar to the above, each ECCE may correspond to nine sets of four physical resource elements known as an EREGs. An ECCE may have other numbers of EREGs in some situations.

The RAN nodes 122 may be configured to communicate with one another via interface 123. In implementations where the system is an LTE system, interface 123 may be an X2 interface. The X2 interface may be defined between two or more RAN nodes 122 (e.g., two or more eNBs/gNBs or a combination thereof) that connect to evolved packet core (EPC) or CN 130, or between two eNBs connecting to an EPC. In some implementations, the X2 interface may include an X2 user plane interface (X2-U) and an X2 control plane interface (X2-C). The X2-U may provide flow control mechanisms for user data packets transferred over the X2 interface and may be used to communicate information about the delivery of user data between eNBs or gNBs. For example, the X2-U may provide specific sequence number information for user data transferred from a master eNB (MeNB) to a secondary eNB (SeNB); information about successful in sequence delivery of PDCP packet data units (PDUs) to a UE 110 from an SeNB for user data; information of PDCP PDUs that were not delivered to a UE 110; information about a current minimum desired buffer size at the SeNB for transmitting to the UE user data; and the like. The X2-C may provide intra-LTE access mobility functionality (e.g., including context transfers from source to target eNBs, user plane transport control, etc.), load management functionality, and inter-cell interference coordination functionality.

As shown, RAN 120 may be connected (e.g., communicatively coupled) to CN 130. CN 130 may comprise a plurality of network elements 132, which are configured to offer various data and telecommunications services to customers/subscribers (e.g., users of UEs 110) who are connected to the CN 130 via the RAN 120. In some implementations, CN 130 may include an evolved packet core (EPC), a 5G CN, and/or one or more additional or alternative types of CNs. The components of the CN 130 may be implemented in one physical node or separate physical nodes including components to read and execute instructions from a machine-readable or computer-readable medium (e.g., a non-transitory machine-readable storage medium). In some implementations, network function virtualization (NFV) may be utilized to virtualize any or all the above-described network node roles or functions via executable instructions stored in one or more computer-readable storage mediums (described in further detail below). A logical instantiation of the CN 130 may be referred to as a network slice, and a logical instantiation of a portion of the CN 130 may be referred to as a network sub-slice. Network Function Virtualization (NFV) architectures and infrastructures may be used to virtualize one or more network functions, alternatively performed by proprietary hardware, onto physical resources comprising a combination of industry-standard server hardware, storage hardware, or switches. In other words, NFV systems may be used to execute virtual or reconfigurable implementations of one or more EPC components/functions.

As shown, CN 130, application servers 140, and external networks 150 may be connected to one another via interfaces 134, 136, and 138, which may include IP network interfaces. Application servers 140 may include one or more server devices or network elements (e.g., virtual network functions (VNFs) offering applications that use IP bearer resources with CN 130 (e.g., universal mobile telecommunications system packet services (UMTS PS) domain, LTE PS data services, etc.). Application servers 140 may also, or alternatively, be configured to support one or more communication services (e.g., voice over IP (VOIP sessions, push-to-talk (PTT) sessions, group communication sessions, social networking services, etc.) for UEs 110 via the CN 130. Similarly, external networks 150 may include one or more of a variety of networks, including the Internet, thereby providing the mobile communication network and UEs 110 of the network access to a variety of additional services, information, interconnectivity, and other network features.

As shown, example network 100 may include an NTN that may comprise one or more satellites 160-1 and 160-2 (collectively, "satellites 160"). Satellites 160 may be in communication with UEs 110 via service link or wireless interface 162 and/or RAN 120 via feeder links or wireless interfaces 164 (depicted individually as 164-1 and 164). In some implementations, satellite 160 may operate as a passive or transparent network relay node regarding communications between UE 110 and the terrestrial network (e.g., RAN 120). In some implementations, satellite 160 may operate as an active or regenerative network node such that satellite 160 may operate as a base station to UEs 110 (e.g., as a gNB of RAN 120) regarding communications between UE 110 and RAN 120. In some implementations, satellites 160 may communicate with one another via a direct wireless interface (e.g., 166) or an indirect wireless interface (e.g., via RAN 120 using interfaces 164-1 and 164-2).

Additionally, or alternatively, satellite 160 may include a GEO satellite, LEO satellite, or another type of satellite. Satellite 160 may also, or alternatively pertain to one or more satellite systems or architectures, such as a global navigation satellite system (GNSS), global positioning system (GPS), global navigation satellite system (GLONASS), BeiDou navigation satellite system (BDS), etc. In some implementations, satellites 160 may operate as bases stations (e.g., RAN nodes 122) with respect to UEs 110. As such, references herein to a base station, RAN node 122, etc., may involve implementations where the base station, RAN node 122, etc., is a terrestrial network node and implementation, where the base station, RAN node 122, etc., is a non-terrestrial network node (e.g., satellite 160).

Figure 2:
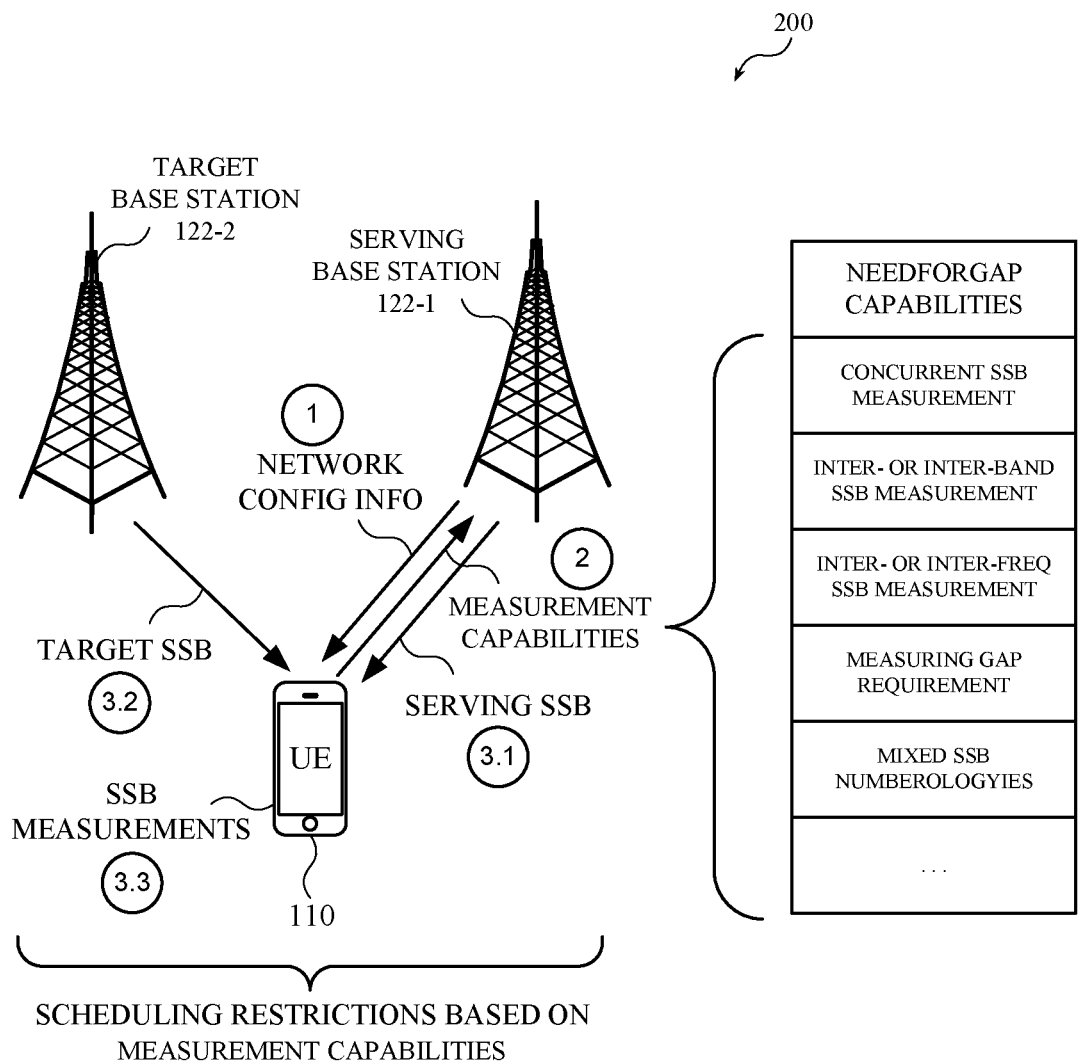
FIG. 2 is a diagram of an example overview of enabling synchronization signal block (SSB) measurements based on SSB measurement capabilities of UE 110 of a user equipment (UE) according to one or more implementations described herein.

FIG. 2 is a diagram of an example overview 200 of enabling SSB measurements based on SSB measurement capabilities of UE 110 according to one or more implementations described herein. As shown, example overview 200 may include UE 110, serving base station 122-1, and target base station 122-2, each of which may perform one or more operation to enable SSB measurements as described below. In some implementations, example overview 200 may include one or more fewer, additional, and/or alternative devices than those depicted in FIG. 2. Similarly, in some implementations, example overview 200 may include fewer, additional, alternative, or differently arranged or sequenced operations. For example, while example overview 200 may correspond to a handover, or potential handover scenario, from serving base station 122-1 to target base station 122-2, concepts represented by example overview 200 may also be applied to other network scenarios or events, such as adding a CC for CA. Thus, example overview 200 is provided as a non-limiting example of the techniques described herein.

As shown, serving base station 122-1 may communicate network configuration information to UE 110 (at 1). In some implementations, this may include a network configuration RRC message. The message may include information relating to enabling UE 110 to measure a signal strength of serving base station 122-1 and/or target base station 122-2 (e.g., a reference signal received power (RSRP)) or signal quality matrix (e.g., reference signal received quality (RSRQ)). The message may also, or alternatively, include information regarding an SMTC window of serving base station 122-1 and/or target base station 122-2, which inform UE 110 regarding a numerology (e.g., FR, frequency band, SMTC window duration and periodicity, SSBs and/or SSB bursts within the SMTC window, etc.). As such, serving base station 122-1 may provide UE 110 with information about various aspects of SMTC windows of serving base station 122-1 and/or target base station 122-2.

UE 110 may respond to the network configuration information by providing serving base station 122-1 with measurement capability information of UE 110 (at 2). The measurement capability information, as described herein, may describe an ability of UE 110 to measure SSBs (e.g., SSBs of serving base station 122-1 and/or target base station 122-2). Doing so may enable serving base station 122-1 and/or target base station 122-2 to determine appropriate scheduling restrictions for UE 110. Examples of measurement capability information may include NEEDFORGAP capabilities, such as an indication of whether UE 110 may perform concurrent SSB measurement (e.g., whether UE 110 may simultaneously measure SSB from different base stations), inter-band SSB measurement capabilities (e.g., whether UE 110 may measure SSBs of different bandwidths), and intra-band SSB measurement capabilities (e.g., whether UE 110 may measure SSBs within the same bandwidth).

NEEDFORGAP capabilities may also, or alternatively, include an indication of inter-frequency SSB measurement capabilities (e.g., whether UE 110 may measure SSBs of different frequencies (e.g., FR1 and FR2), intra-frequency SSB measurement capabilities (e.g., whether UE 110 may measure SSBs of the same frequencies (e.g., FR1 and FR2), measurement gap requirements (e.g., whether UE 110 requires a measurement gap to measure SSBs of different base stations 122), whether UE 110 may support (e.g., measure) SSBs corresponding to mixed (e.g., different) numerologies, etc. In some implementations, the capability information described above may be included in one or more messages, information elements (IEs).

In response to UE 110 receiving network configuration information from serving base station 122-1 (at 1) and respond with measurement capabilities information (at 2), serving base station 122-1 and/or UE 110 may determine whether and/or which scheduling restrictions may apply to UE 110. An example of scheduling restrictions may include whether UE 110 to transmit on a physical uplink control channel (PUCCH), physical uplink shared channel (PUSCH), and/or a sounding reference signal (SRS) for one or more symbols of an SMTC window SSB. An additional example of a scheduling restriction may include whether UE 110 is to receive on a physical downlink control channel (PDCCH), a physical downlink shared channel (PDSCH), a tracking reference signal (TRS), a channel state information (CSI) reference signal (RS) (CSI-RS) for channel quality indicator (CQI) on symbols within an a SMTC window SSB.

Determining scheduling restrictions may enable UE 110 to, for example, receive and measure (at 3.1, 3.2, and 3.3) SSBs from serving base station 122-1 and/or target base station 122-2. In turn, UE 110 may proceed by, for example, performing a handover procedure from serving base station 122-1 to target base station 122-2. Additional examples, descriptions, and details of aspects of example overview 200 are described below with reference to the remaining figures, one or more of which may be applied to handover procedures, adding a CC during CA, and/or one or more other types of procedures.

Figure 3:
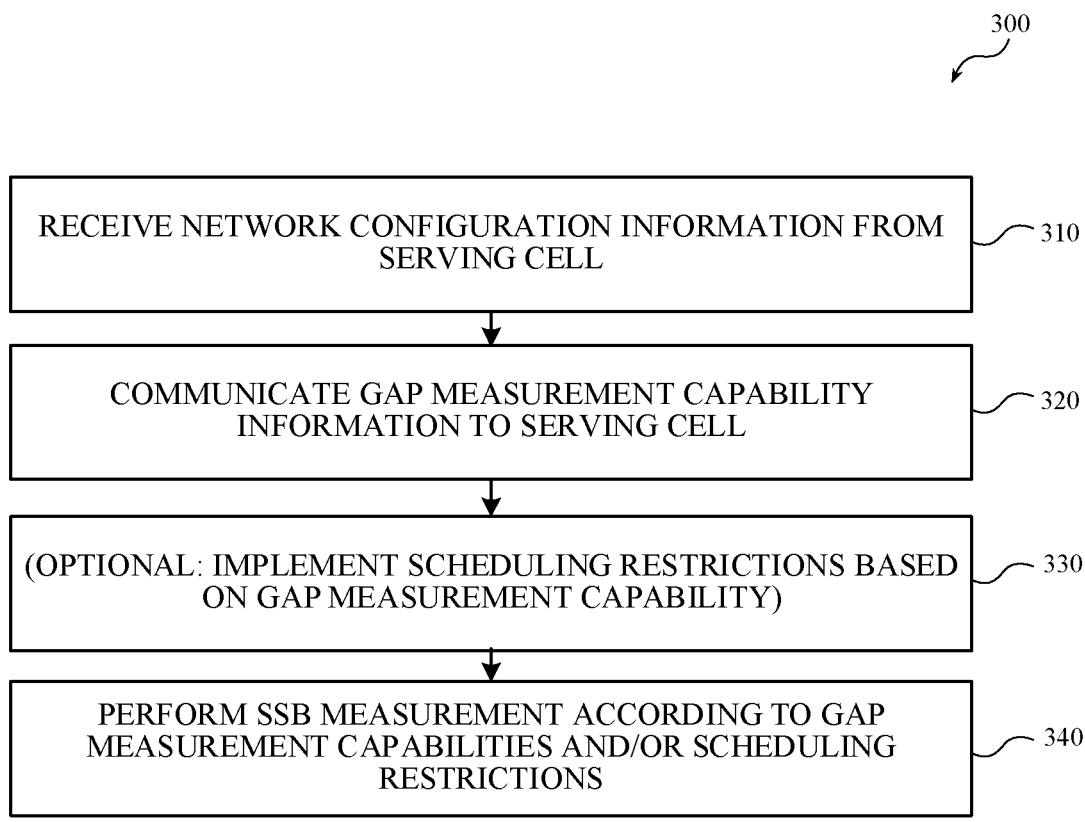
FIG. 3 is a diagram of an example of a process for enabling SSB measurements based on capabilities of a UE according to one or more implementations described herein.

FIG. 3 is a diagram of an example of a process 300 for enabling SSB measurement capabilities of UE 110 according to one or more implementations described herein. Process 300 may be implemented by UE 110. In some implementations, some or all of process 300 may be performed by one or more other systems or devices, including one or more of the devices of FIG. 1. Additionally, process 300 may include one or more fewer, additional, differently ordered and/or arranged operations than those shown in FIG. 3. In some implementations, some or all of the operations of process 300 may be performed independently, successively, simultaneously, etc., of one or more of the other operations of process 300. As such, the techniques described herein are not limited to a number, sequence, arrangement, timing, etc., of the operations or process depicted in FIG. 3. Additionally, while process 300 may be primarily described from the perspective a particular device (e.g., UE 110), the techniques described herein also include corresponding operations performed by a corresponding device (e.g., another UE 110, a serving base station 122, a target base station 122, etc.).

As shown, process 300 may include receiving network configuration information a serving cell (block 310). For example, UE 110 may receive an RRC message from base station 122, with which UE 110 is connected and/or communicating. The RRC message may include one or more types of the network configuration information, including information relating to UE 110 synchronizing with base station 122, another base station 122 (e.g., a target base station), SSBs transmitted by one or more base stations, SSB bursts transmitted by one or more base stations, numerology information relating to obtaining NeedForGap information from UE 110, etc.

Process 300 may also include communicating gap measurement capability information to the serving cell (block 320). For instance, UE 110 may communicate NeedForGap capability information to base station 122. As described herein, gap measurement capability may include an indication of a capability of UE 110 to engage in gap measurement procedures, a capability of UE 110 to engage in gap measurement procedures relating to SSB measurement occasions corresponding to one or more base stations 122, a capability of UE 110 to receive or measure SSB bursts corresponding to different numerologies, etc. UE 110 may indicate that UE 110 is capable of gapless measurement regarding a target base station 122-2, which may indicate an ability of UE 110 to concurrently receive SSBs from a target base station 122-2 and signaling from a serving base station 122-1. In some implementations, UE 110 may indicate this as a "no gap" value provided to a serving base station 122-1. As used herein, an inter-frequency scenario may include carriers of different frequencies. The frequencies may be in the same band (e.g., intra-band) or in different bands (e.g., inter-band). Additionally, different frequency bands may be in the same frequency range or different frequency ranges.

Process 300 may also include (optionally) implementing scheduling restrictions based on gap measurement capability (block 330). For example, UE 110 may implement one or more scheduling restrictions based on the gap measurement capability communicated to base station 122. As described herein, a scheduling restriction may include, for example, UE 110 not using a physical uplink control channel (PUCCH) physical uplink shared channel (PUSCH), and/or a sounding reference signal (SRS) for one or more symbols of a SMTC window duration of an inter-frequency cell or SSB measurement. Additionally, or alternatively, a scheduling restriction may include, for example, UE 110 not using a physical downlink control channel (PDCCH), a physical downlink shared channel (PDSCH), a tracking reference signal (TRS), a channel state information (CSI) reference signal (RS) (CSI-RS) for channel quality indicator (CQI) on all symbols within an SMTC window duration of an inter-frequency cell, or SSB, measurement. Additional scheduling restrictions are also discussed and described herein, along with one or more conditions or scenarios that may be associated with a given scheduling condition.

Process 300 may also include performing an SSB measurement according to gap measurement capabilities and/or scheduling restrictions (block 340). For example, UE 110 may measure one or more SSBs, of an SSB burst, within a SMTC window. UE 110 may do so in accordance with the gap measurement capabilities of UE 110 (e.g., intra-frequency measurements, inter-frequency measurements, concurrent SSB measurements, etc.). UE 110 may also, or alternatively, perform an SSB measurement according to one or more scheduling restrictions, such as not transmit a PUCCH, PUSCH, SRS, etc., or receiving a PDCCH, PDSCH, TRS, or CSI-RS, for CQI on all symbols within an SMTC window.

As mentioned above, process 300 may include one or more additional operations included in the techniques described herein. For example, in response to performing one or more SSB measurements, UE 110 may proceed by performing one or more additional operations. Examples of such operations may include proceeding with a handover procedure toward the target base station 122, adding a CC for communicating with the network, etc.

Figure 4:
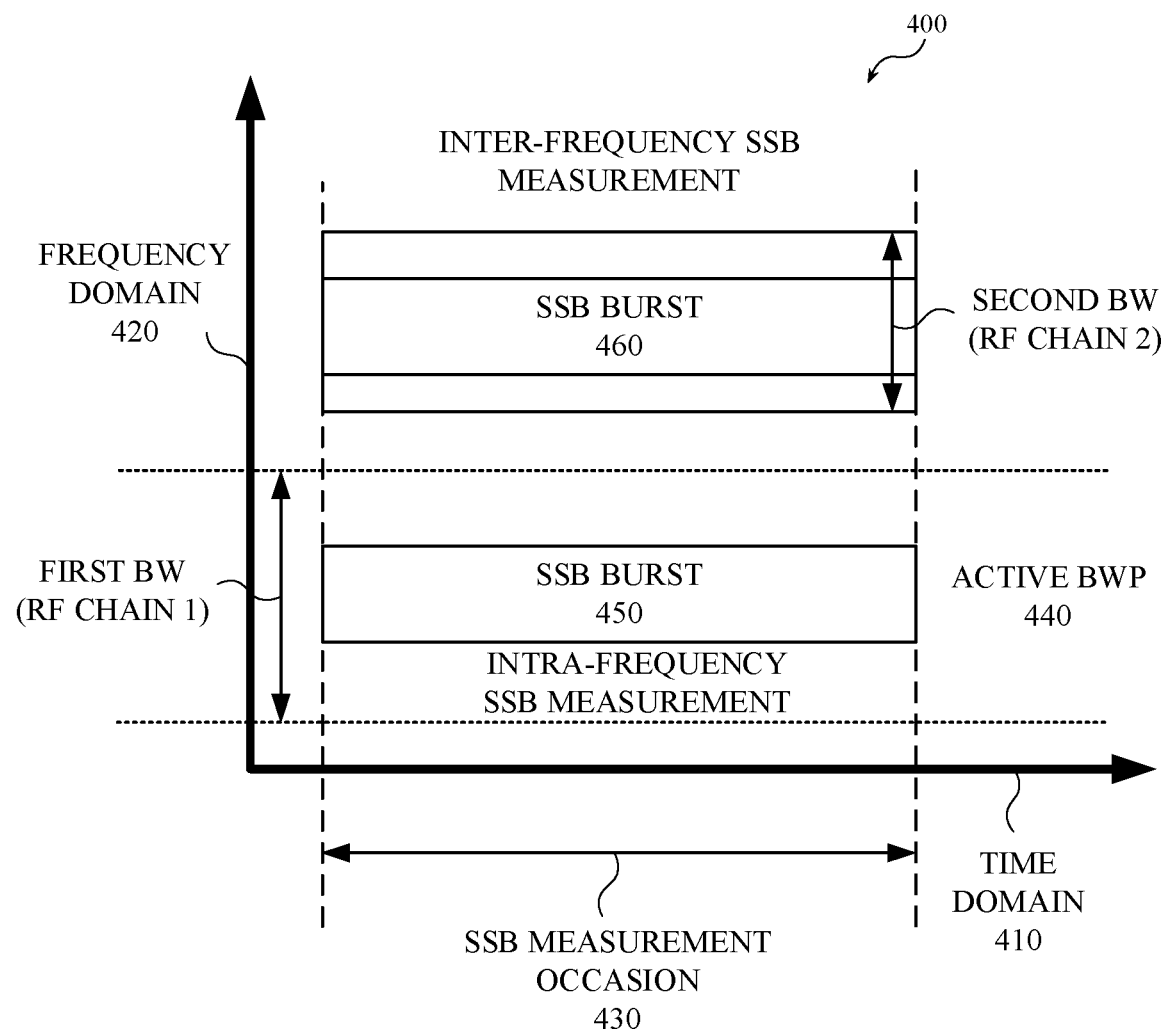
FIG. 4 is a diagram of an example of enabling an inter-frequency SSB measurement and intra-frequency SSB measurement according to one or more implementations described herein.

FIG. 4 is a diagram of an example 400 of enabling an inter-frequency SSB measurement and intra-frequency SSB measurement according to one or more implementations described herein. As shown, example 400 includes a time domain 410 as a horizontal axis and a frequency domain 420 as a vertical axis. A first bandwidth (BW) (or RF chain 1) may include one portion of frequency domain 420. The first BW may extend before, during, and after a SSB measurement occasion 430 located along time domain 410, and the first BW may include an active BWP 440, which may be associated with. The first BW and active BWP 440 may correspond to serving cell 122 for UE 110.

During SSB measurement occasion 430 a portion of the first BW may be allocated to an SSB burst 450 from serving cell 122. Because SSB burst 450 is located within the first BW and part of active BWP 440, SSB burst 450 may comprise an intra-frequency measurement scenario. For purposes of explaining FIG. 4, assume that prior to SSB measurement occasion 530, UE 110 had received an RRC message from serving cell 122 indicating that target cell 122 was configured to transmit SSB burst 460 using a second BW (RF chain 2), using a different portion of frequency domain 420 but same portion of time domain 410 (e.g., an inter-frequency cell SSB outside active BWP 440 of UE 110 and on a different band).

Assume also that UE 110 responded to serving cell 122 by indicating that UE 110 supports concurrent SSB based inter-frequency measurement without measurement gap on a neighboring cell, which is outside UE active BWP and PDCCH or PDSCH reception from the serving cell with a different numerology. In other words, UE 110 may indicate support of "no-gap" for the inter-frequency SSB measurement using a second RF chain in the second BW as represented in FIG. 4. Consequently, UE 110 may perform concurrent SSB measurement of SSB bursts 450 and 460 by using an active BW for intra-frequency SSB measurement and a second BW (limited to SSB measurement occasion 430) for inter-frequency SSB measurement.

Figure 5:
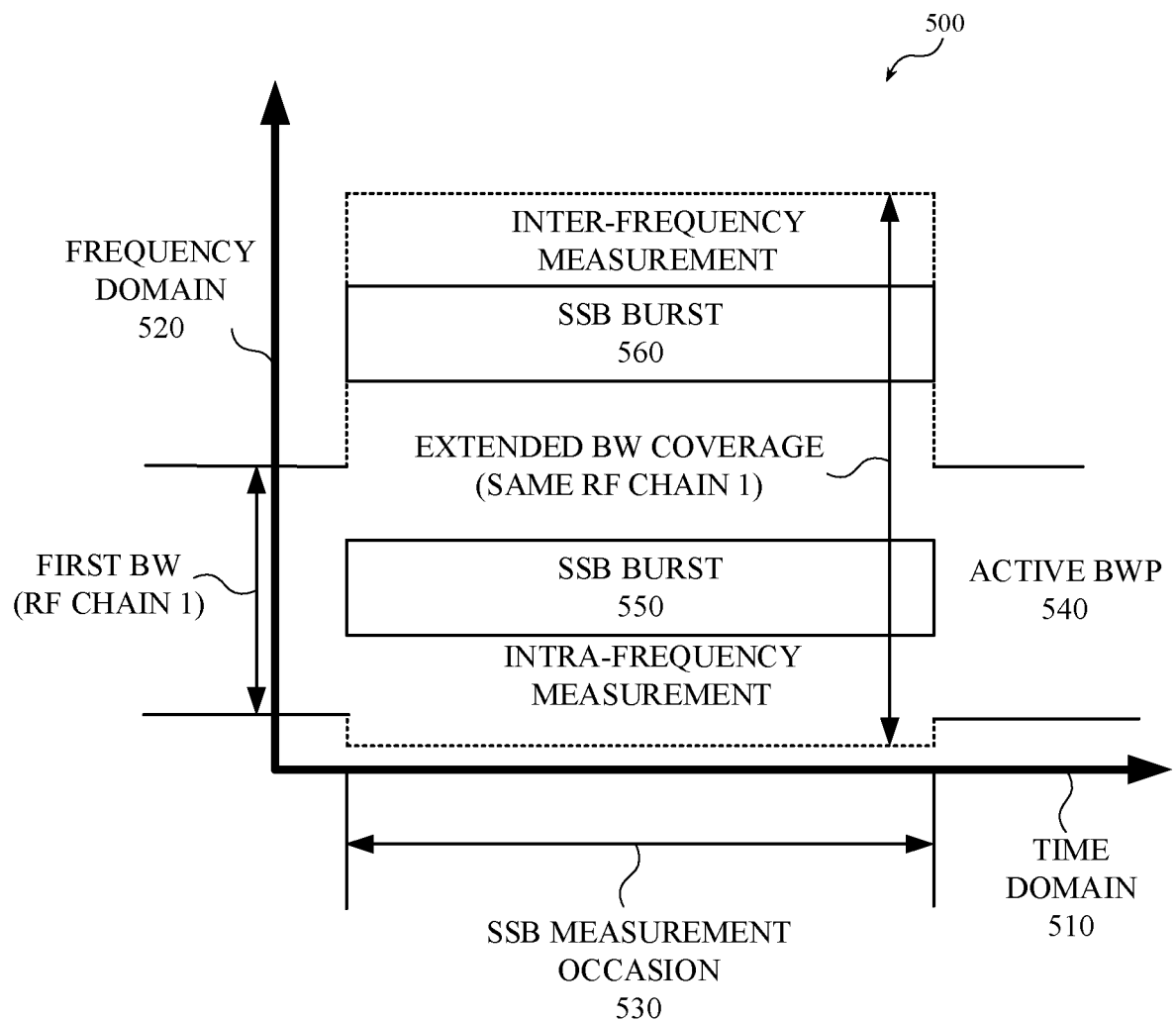
FIG. 5 is a diagram of an example of enabling inter-frequency SSB measurements according to one or more implementations described herein.

FIG. 5 is a diagram of an example of enabling inter-frequency SSB measurements according to one or more implementations described herein. As shown, example 500 includes a time domain 510 as a horizontal axis and a frequency domain 520 as a vertical axis. A first bandwidth (BW) (or RF chain 1) may include one portion of frequency domain 520. The first BW may extend before, during, and after a SSB measurement occasion 530 located along time domain 510, and the first BW may include an active BWP 540, a serving base station 122-1. The first BW and active BWP 440 may correspond to serving cell 122 for UE 110.

During SSB measurement occasion 530 a portion of the first BW may be allocated to an SSB burst 550 from serving cell 122. Because SSB burst 550 is located within the first BW and part of active BWP 540, SSB burst 550 may comprise an intra-frequency measurement scenario. For purposes of explaining FIG. 5, assume that prior to SSB measurement occasion 530, UE 110 had received an RRC message from serving cell 122 indicating that target cell 122 was configured to transmit SSB burst 560 using a different portion of frequency domain 520 but same portion of time domain 510 as indicated in FIG. 5.

Assume also that UE 110 responded to serving cell 122 by indicating that UE 110 supports concurrent SSB based intra-band (e.g., same band) inter-frequency (e.g., different frequency) measurement without measurement gap on a neighboring cell (e.g., target base station) which is outside UE active BWP 540 and PDCCH or PDSCH reception from serving base station 122 with a different numerology. In other words, UE 110 may indicate to serving base station 122 support of "no-gap" for this intra-band inter-frequency SSB measurement scenario. Consequently, UE 110 may perform concurrent SSB measurement of SSB bursts 550 and 560 by extending the first BW to include both SSB burst 550 and SSB 560 using the same RF chain (RF chain 1) for concurrent SSB measurement. As shown, UE 110 may thereafter revert the scope of the extended bandwidth back to the pre-SSB measurement occasion 550 bandwidth.

Alternatively, UE 110 may respond to serving cell 122 by indicating that UE 110 supports concurrent SSB based inter-band (e.g., different band) inter-frequency (e.g., different frequency) measurement without measurement gap on a neighboring cell (e.g., target base station) which is outside UE active BWP 540 and PDCCH or PDSCH reception from the serving cell with a different numerology. In other words, UE 110 may indicate to serving base station 122 support of "no-gap" for this inter-band inter-frequency SSB measurement. Consequently, UE 110 may perform concurrent SSB measurement of SSB bursts 550 and 560 in a similar manner as that represented in FIG. 4 (e.g., by performing concurrent SSB measurement of SSB bursts 550 and 560 by using an active BW for intra-frequency SSB measurement 550 and a second BW (e.g., RF chain) for SSB burst 560. In this manner, UE 110 may perform concurrent SSB based inter-band (e.g., different band) inter-frequency (e.g., different frequency) measurement without measurement gap on a neighboring cell.

It should be noted that indications of the capabilities described herein, such as those in FIG. 4, FIG. 5, and elsewhere throughout the description herein, may be applied with particularly to one or more, or any combination, of any of the following: a per-broadcast (BC) indication, a per-UE indication, a per-frequency radio (FR) indication, or a per-band indication, or a per-band and per-BC indication.

Additionally, aspects of the examples of FIG. 4 and FIG. 5 may be applied to scenarios involving a downlink (DL) reference signal (RS) on serving cell. For example, UE 110 may indicate a capability to support mixed numerologies between an SSB and serving CC DL RS when UE is performing inter-frequency (e.g., different frequency) measurements without MG and the inter-frequency SSB is outside an active BWP of UE 110. In such a scenario, UE 110 may indicate whether UE 110 supports concurrent SSB based inter-frequency measurement without measurement gap on a neighboring cell which is outside an active BWP of UE 110 and SSB or CSI-RS reception from serving base station 122 with a different numerology. In such a scenario, UE may indicate support of this by provide a "no-gap" value for such an inter-frequency SSB measurement.

Additionally, or alternatively, UE 110 may be configured to indicate whether UE 110 supports concurrent SSB based intra-band (e.g., same band) inter-frequency (e.g., different frequency) measurements, without measurement gap, on a target base station 122 (e.g., neighboring cell) which is outside an active BWP of UE 110 and SSB or CSI-RS reception from the serving cell with a different numerology. In such a scenario, UE 110 may indicate support of this by providing a "no-gap" value for such an intra-band (e.g., same band) inter-frequency (e.g., different frequency) SSB measurements. UE 110 may also, or alternatively be configured to indicate whether the UE 110 supports concurrent SSB based inter-band, inter-frequency measurement, without measurement gap, on target base station 122 (e.g., neighboring cell) which is outside an active BWP of UE 110 and SSB or CSI-RS reception from the serving cell with a different numerology. In such a scenario, UE may indicate support of this by provide a "no-gap" value for this intra-band (e.g., same band) inter-frequency (e.g., different frequency) SSB measurements. In such a scenario, UE 110 may indicate support of this by providing a "no-gap" value for such an inter-band inter-frequency SSB measurement.

Figure 6:
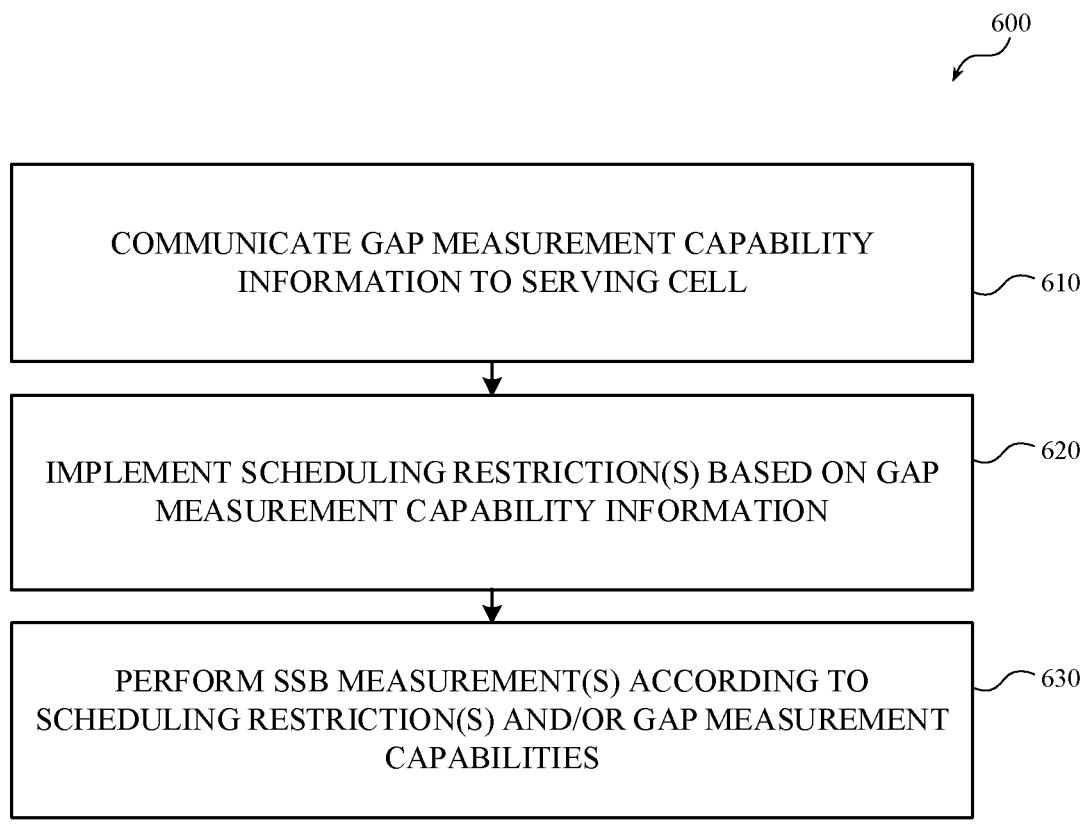
FIG. 6 is a diagram of an example of a process for enabling SSB measurements based on SSB measurement capabilities of UE according to one or more implementations described herein.

FIG. 6 is a diagram of an example of a process 600 for enabling SSB measurements based on SSB measurement capabilities of UE 110 according to one or more implementations described herein. Process 600 may be implemented by UE 110. In some implementations, some or all of process 600 may be performed by one or more other systems or devices, including one or more of the devices of FIG. 1. Additionally, process 600 may include one or more fewer, additional, differently ordered and/or arranged operations than those shown in FIG. 6. In some implementations, some or all of the operations of process 600 may be performed independently, successively, simultaneously, etc., of one or more of the other operations of process 600. As such, the techniques described herein are not limited to a number, sequence, arrangement, timing, etc., of the operations or process depicted in FIG. 6. Additionally, while process 00 may be primarily described from the perspective a particular device (e.g., UE 110), the techniques described herein also include corresponding operations performed by a corresponding device (e.g., another UE 110, a serving base station 122, a target base station 122, etc.).

As much of the following description may include options or alternatives for UE 110 indicating gap measurement capabilities to the network, implementing scheduling restriction based on the gap measurement capabilities, and performing measurements in accordance with the gap measurement capabilities, FIG. 6 is provided as a general framework, or visual reference, for the many options or alternatives described below. Consequently, as shown, example process 600 may include communicating gap measurement capability information to a serving cell (e.g., base station 122) (block 610). Process 600 may also include implementing one or more scheduling restrictions based on the gap measurement capability information (block 620). And process 600 may also include performing SSB measurements in accordance with scheduling restrictions and/or gap measurement capabilities (block 630).

FIGS. 7-10 are diagrams of examples 700-1000 of UE capabilities and corresponding scheduling restrictions for FR1 inter-frequency measurements without MG according to one or more implementations described herein. Examples 700-1000 may represent how one or more devices (e.g., UE 110, source base station 122, target base station 122, etc.) may respond based on a network configuration of source base station 122 and/or target base station 122) and measurement capabilities of UE 110 regarding the network configuration.

Depending on the implementations, one or more of the combinations of UE capabilities and corresponding scheduling restriction depicted in FIGS. 7-10 may be implemented in combination with one or more other combinations of UE capabilities and corresponding scheduling restriction depicted in FIGS. 7-10. Alternatively, in some scenarios, the implementation of one or more combinations of UE capabilities and corresponding scheduling restriction depicted in FIGS. 7-10 may exclude implementation of one or more other combinations of UE capabilities and corresponding scheduling restriction depicted in FIGS. 7-10. Additionally, one or more UE capabilities depicted in one or more of FIGS. 7-10 may be reassigned, or otherwise associated with, another scheduling restriction FIGS. 7-10.

As shown, example 700 includes a configuration (1) for FR1 inter-frequency measurement without MG, which associates a UE capability (1.1) with a corresponding scheduling restriction (1.1). As such, example 700 may represent a configuration of one or more devices (e.g., UE 110, source base station 122, target base station 122, etc.) to respond in certain ways based on SSD measurement capabilities of a particular UE 110. As such, example 700 may represent a configuration of one or more devices (e.g., UE 110, source base station 122, target base station 122, etc.) to respond in certain ways based on measurement capabilities of UE 110.

For example, per UE capability 1.1, UE 110 may indicate no support for mixed numerology between inter-frequency SSBs outside an active BWP of UE 110 and outside a subcarrier spacing (SCS) of a serving base station 122 (regardless of an intra-band SSB scenario (see, e.g., FIG. 4) and/or an inter-band SSB scenario (see, e.g., FIG. 5). In such scenarios, as indicated by scheduling restriction 1.1, UE 110 and/or source base station 122 may determine a scheduling restraint applies to UE 110, such that UE 110 may not transmit on PUCCH/PUSHC/SRS or receive on PDCCH/PDSCH/TRS/CSI-RS for CQI on all symbols within an SMTC window of an inter-frequency cell or SSB measurement.

Example 800 includes a configuration (2) for FR1 inter-frequency measurement without MG, which associates a UE capability (2.1) with a corresponding scheduling restriction (2.1). Configuration 2 also associates different UE capability (2.2) with a different scheduling restriction (2.2). As such, example 800 may represent a configuration of one or more devices (e.g., UE 110, source base station 122, target base station 122, etc.) to respond in certain ways based on measurement capabilities of UE 110.

As shown, example 800 includes a configuration (1) for FR1 inter-frequency measurement without MG. Example 800 may represent a configuration of one or more devices (e.g., UE 110, source base station 122, target base station 122, etc.) to respond in certain ways based on measurement capabilities of UE 110. For example, as indicated by UE capability 2.1, UE 100 110 may indicate that UE 110 does not support mixed numerology between inter-frequency SSBs outside an active BWP of UE 110 and serving base station 122 SCS for intra-band scenarios (see, e.g., FIG. 5). In such scenarios, per scheduling restriction 2.1, UE 110 and/or source base station 122 may determine a scheduling restraint applies to UE 110, such that UE 110 may not transmit on PUCCH/PUSHC/SRS or receive on PDCCH/PDSCH/TRS/CSI-RS for CQI on all symbols within an SMTC window of an inter-frequency cell or SSB measurement.

Per UE capability 2.2, UE 110 may indicate that UE 110 does not support mixed numerology between inter-frequency SSBs outside an active BWP of UE 110 and serving base station 122 SCS for inter-band scenarios (see, e.g., FIG. 4). In such a scenario, and per scheduling restriction 2.2, no scheduling redirection may be applied to transmit PUCCH/PUSCH/SRS or receive PDCCH/PDSCH/TRS/CSI-RS for CQI on all symbols within an SMTC window duration of the inter-frequency cell (e.g., target base station 122) or SSB measurement.

Example 900 includes a configuration (3) for FR1 inter-frequency measurement without MG, which associates a UE capability (3.1) with a corresponding scheduling restriction (3.1). Configuration 3 associates a different UE capability (3.2) with a different scheduling restriction (3.2). As such, example 900 may represent a configuration of one or more devices (e.g., UE 110, source base station 122, target base station 122, etc.) to respond in certain ways based on measurement capabilities of UE 110.

For example, per UE capability 3.1, UE 110 may indicate that UE 110 can determine inter-frequency cell timing or be aligned with serving base station 122-1 (e.g., there is at least one cell on that inter-frequency carrier measured/detected by UE 110). UE 110 may also, or alternatively, indicate no support for mixed numerology between inter-frequency SSBs outside an active BWP of UE 110 and outside an SCS of a serving base station 122-1 (regardless of an intra-band SSB scenario (see, e.g., FIG. 4) and/or an inter-band SSB scenario (see, e.g., FIG. 5). As such, per scheduling restriction 3.1, UE 110 may not be expected to transmit PUCCH/PUSCH/SRS or receive PDCCH/PDSCH/TRS/CSI-RS for CQI on SSB symbols to be measured, received signal strength indicator (RSSI) measurement symbols if RSSI measurement is needed (e.g., in reference signal received quality (RSRQ) measurement), and on 1 data symbol before each consecutive SSB/RSSI symbols to be measured and 1 data symbol after each consecutive SSB/RSSI symbols to be measured within an SMTC window duration.

Additionally, or alternatively, per UE capability 3.2, UE 110 may indicate that UE 110 may be unable to determine inter-frequency cell timing and support mixed numerology between inter-frequency SSBs outside an active BWP of UE 110 and serving base station 122-1 110 SCS (regardless of an intra-band scenario (see, e.g., FIG. 5) and/or inter-band scenario (see, e.g., FIG. 4)). In such scenarios, as shown in scheduling restriction 3.2 UE 110 and/or source base station 122 may determine a scheduling restraint applies to UE 110, such that UE 110 may not transmit on PUCCH/PUSHC/SRS or receive on PDCCH/PDSCH/TRS/CSI-RS for CQI on all symbols within an SMTC window of an inter-frequency cell or SSB measurement.

Example 1000 includes a configuration (4) for FR1 inter-frequency measurement without MG, which associates a UE capability (4.1) with a corresponding scheduling restriction (4.1). Configuration 3 also associates UE capability (4.2) with a scheduling restriction (4.2), as well as UE capability (4.3) with a scheduling restriction (4.3). As such, example 1000 may represent a configuration of one or more devices (e.g., UE 110, source base station 122, target base station 122, etc.) to respond in certain ways based on measurement capabilities of UE 110.

For example, per UE capability 4.1, UE 110 may indicate that UE 110 can determine inter-frequency cell timing or be aligned with serving base station 122-1 (e.g., there is at least one cell on that inter-frequency carrier measured/detected by UE 110). UE 110 may also, or alternatively, indicate no support for mixed numerology between inter-frequency SSBs outside an active BWP of UE 110 and outside an SCS of a serving base station 122-1 for intra-band scenarios (see, e.g., FIG. 4). As such, per scheduling restriction 4.1, UE 110 may not be expected to transmit PUCCH/PUSCH/SRS or receive PDCCH/PDSCH/TRS/CSI-RS for CQI on SSB symbols to be measured, RSSI measurement symbols if RSSI measurement is needed (e.g., in RSRQ measurement), and on 1 data symbol before each consecutive SSB/RSSI symbols to be measured and 1 data symbol after each consecutive SSB/RSSI symbols to be measured within an SMTC window duration.

Additionally, or alternatively, per UE capability 4.2, UE 110 may indicate that UE 110 may be unable to determine inter-frequency cell timing and no support for mixed numerology between inter-frequency SSBs outside an active BWP of UE 110 and serving base station 122-1 SCS for intra-band scenario (see, e.g., FIG. 5). In such scenarios, as shown in scheduling restriction 4.2 UE 110 and/or source base station 122 may determine a scheduling restraint applies to UE 110, such that UE 110 may not transmit on PUCCH/PUSHC/SRS or receive on PDCCH/PDSCH/TRS/CSI-RS for CQI on all symbols within an SMTC window of an inter-frequency cell or SSB measurement.

Per UE capability 4.3, UE 110 may indicate that UE 110 can determine inter-frequency cell timing or be aligned with serving base station 122-1 (e.g., there is at least one cell on that inter-frequency carrier measured/detected by UE 110). UE 110 may also, or alternatively, indicate no support for mixed numerology between inter-frequency SSBs outside an active BWP of UE 110 and outside an SCS of a serving base station 122-1 for inter-band scenarios (see, e.g., FIG. 4). In such scenarios, as shown in scheduling restriction 4.3 UE 110 and/or source base station 122 may determine a scheduling restraint applies to UE 110, such that UE 110 may not transmit on PUCCH/PUSHC/SRS or receive on PDCCH/PDSCH/TRS/CSI-RS for CQI on all symbols within an SMTC window of an inter-frequency cell or SSB measurement.

Figure 12:

FIGS. 11-12 are diagrams of examples 1100-1200 of UE capabilities and corresponding scheduling restrictions for FR2 inter-frequency measurements without MG according to one or more implementations described herein. Examples 1100-1200 may represent how one or more devices (e.g., UE 110, source base station 122, target base station 122, etc.) may respond based on a network configuration of source base station 122 and/or target base station 122) and measurement capabilities of UE 110 regarding the network configuration.

Depending on the implementations, one or more of the combinations of UE capabilities and corresponding scheduling restriction depicted in FIGS. 11-12 may be implemented in combination with one or more other combinations of UE capabilities and corresponding scheduling restriction depicted in FIGS. 11-12. Alternatively, in some scenarios, the implementations of one or more combinations of UE capabilities and corresponding scheduling restriction depicted in FIGS. 11-12 may exclude implementation of one or more other combinations of UE capabilities and corresponding scheduling restriction depicted in FIGS. 11-12. Additionally, one or more UE capabilities depicted in one or more of FIGS. 11-12 may be reassigned, or otherwise associated with, another scheduling restriction FIGS. 11-12.

Example 1100 includes a configuration (5) for scheduling restrictions for FR2 inter-frequency measurement without MG, which associates a UE capability (5.1) with a corresponding scheduling restriction (5.1). As such, example 1100 may represent a configuration of one or more devices (e.g., UE 110, source base station 122, target base station 122, etc.) to respond in certain ways based on SSD measurement capabilities of UE 110.

For example, per UE capability 5.1, UE 110 may indicate no support for mixed numerology between inter-frequency SSBs outside an active BWP of UE 110 and outside a subcarrier spacing (SCS) of a serving base station 122 (regardless of an intra-band SSB scenario (see, e.g., FIG. 4) and/or an inter-band SSB scenario (see, e.g., FIG. 5). In such scenarios, as indicated by scheduling restriction 1.1, UE 110 and/or source base station 122 may determine a scheduling restraint applies to UE 110, such that UE 110 may not transmit on PUCCH/PUSHC/SRS or receive on PDCCH/PDSCH/TRS/CSI-RS for CQI on all symbols within an SMTC window of an inter-frequency cell or SSB measurement.

Per UE capability 5.2, UE 110 may indicate that UE 110 can determine inter-frequency cell timing or be aligned with serving base station 122-1 (e.g., there is at least one cell on that inter-frequency carrier measured/detected by UE 110 and, for example, deriveSSB-IndexFromCell is enabled on the carrier). In such scenarios, as shown in scheduling restriction 5.2 UE 110 and/or source base station 122 may determine a scheduling restraint applies to UE 110, such that UE 110 UE 110 may not be expected to transmit PUCCH/PUSCH/SRS or receive PDCCH/PDSCH/TRS/CSI-RS for CQI on SSB symbols to be measured, RSSI measurement symbols if RSSI measurement is needed (e.g., in RSRQ measurement), and on 1 data symbol before each consecutive SSB/RSSI symbols to be measured and 1 data symbol after each consecutive SSB/RSSI symbols to be measured within an SMTC window duration.

Example 1200 includes a configuration (6) for FR2 inter-frequency measurement without MG, which associates a UE capability (6.1) with a corresponding scheduling restriction (6.1). Configuration 3 also associates UE capability (6.2) with a scheduling restriction (6.2), as well as UE capability (6.3) with a scheduling restriction (6.3). As such, example 1200 may represent a configuration of one or more devices (e.g., UE 110, source base station 122, target base station 122, etc.) to respond in certain ways based on measurement capabilities of UE 110. Example 1200 may involve an inter-band inter-frequency scenario where, for example, a serving cell and target inter-frequency cell are on different bands.

Per UE capability 6.1, UE 110 may indicate that UE 110 may support independent beam management (IBM) band pair COPMRISING serving cell band and inter-frequency cell band. In such scenarios, as shown in scheduling restriction 6.2, UE 110 and/or source base station 122 may determine that no scheduling redirection for transmitting PUCCH/PUSCH/SRS or receiving PDCCH/PDSCH/TRS/CSIRS for CQI on all symbols within a SMTC window duration of the inter-frequency cell or SSB measurement.

Per UE capability 6.2, UE 110 may indicate that UE 110 may not support an IBM band pair comprising a serving cell band and inter-frequency cell band, or a serving cell band and inter-frequency cell band that is a common beam management (CBM) band pair. In such scenarios, as shown in scheduling restriction 6.2, UE 110 and/or source base station 122 may determine a scheduling restraint applies to UE 110, such that UE 110 may not transmit on PUCCH/PUSHC/SRS or receive on PDCCH/PDSCH/TRS/CSI-RS for CQI on all symbols within an SMTC window of an inter-frequency cell or SSB measurement.

Per UE capability 6.3, UE 110 may indicate that UE 110 can determine inter-frequency cell timing or be aligned with serving base station 122-1 (e.g., there is at least one cell on that inter-frequency carrier measured/detected by UE 110 and, for example, deriveSSB-IndexFromCell is enabled on the carrier). In such scenarios, as shown in scheduling restriction 6.3 UE 110 and/or source base station 122 may determine a scheduling restraint applies to UE 110, such that UE 110 UE 110 may not be expected to transmit PUCCH/PUSCH/SRS or receive PDCCH/PDSCH/TRS/CSI-RS for CQI on SSB symbols to be measured, RSSI measurement symbols if RSSI measurement is needed (e.g., in RSRQ measurement), and on 1 data symbol before each consecutive SSB/RSSI symbols to be measured and 1 data symbol after each consecutive SSB/RSSI symbols to be measured within an SMTC window duration.

FIG. 13 is a diagram of an example 1300 of UE capabilities and corresponding scheduling restrictions for cross FR inter-frequency measurements without MGs according to one or more implementations described herein. As shown, example 1300 includes a configuration (7) for scheduling restrictions for cross FR inter-frequency measurements without MG, which associates a UE capability (7.1) with a corresponding scheduling restriction (7.1).

As shown in example 1300, per UE capability 7.1, UE 110 may indicate that UE 110 may support cross FR inter-frequency measurement without MG (e.g., a serving cell on one FR and target inter frequency cell on another FR). In such scenarios, as shown in scheduling restriction 6.3, UE 110 and/or source base station 122 may determine that no scheduling redirection for transmitting PUCCH/PUSCH/SRS or receiving PDCCH/PDSCH/TRS/CSI-RS for CQI on all symbols within a SMTC window duration of the inter-frequency cell or SSB measurement.

Figure 14:
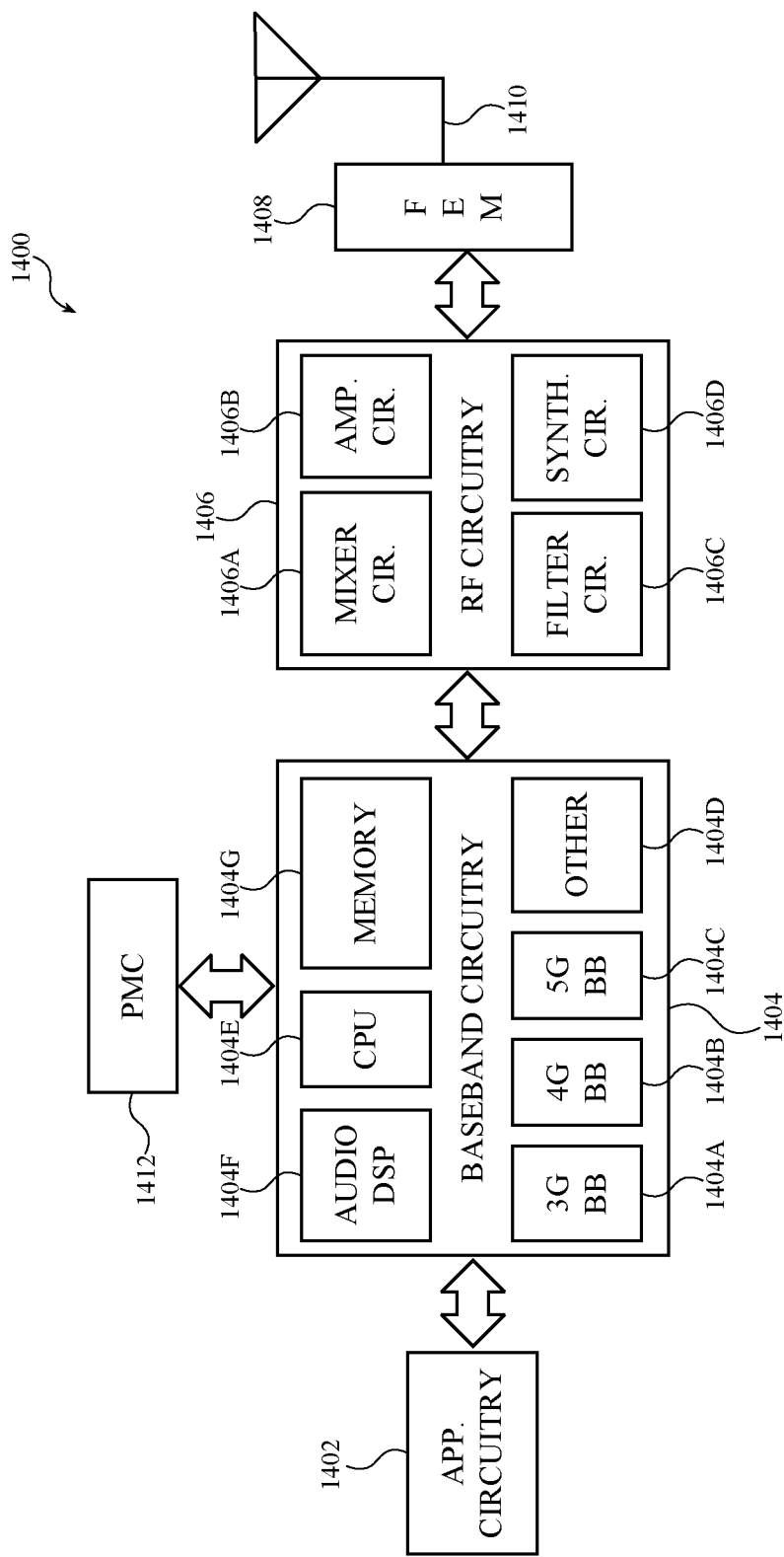
FIG. 14 is a diagram of an example of components of a device according to one or more implementations described herein.

FIG. 14 is a diagram of an example of components of a device according to one or more implementations described herein. In some implementations, the device 1400 can include application circuitry 1402, baseband circuitry 1404, RF circuitry 1406, front-end module (FEM) circuitry 1408, one or more antennas 1410, and power management circuitry (PMC) 1412 coupled together at least as shown. The components of the illustrated device 1400 can be included in a UE or a RAN node. In some implementations, the device

1400 can include fewer elements (e.g., a RAN node may not utilize application circuitry 1402, and instead include a processor/controller to process IP data received from a CN such as 5GC 130 or an Evolved Packet Core (EPC)). In some implementations, the device 1400 can include additional elements such as, for example, memory/storage, display, camera, sensor (including one or more temperature sensors, such as a single temperature sensor, a plurality of temperature sensors at different locations in device 1400, etc.), or input/output (I/O) interface. In other implementations, the components described below can be included in more than one device (e.g., said circuitries can be separately included in more than one device for Cloud-RAN (C-RAN) implementations).

The application circuitry 1402 can include one or more application processors. For example, the application circuitry 1402 can include circuitry such as, but not limited to, one or more single-core or multi-core processors. The processor(s) can include any combination of general-purpose processors and dedicated processors (e.g., graphics processors, application processors, etc.). The processors can be coupled with or can include memory/storage and can be configured to execute instructions stored in the memory/storage to enable various applications or operating systems to run on the device 1400. In some implementations, processors of application circuitry 1402 can process IP data packets received from an EPC.

The baseband circuitry 1404 can include circuitry such as, but not limited to, one or more single-core or multi-core processors. The baseband circuitry 1404 can include one or more baseband processors or control logic to process baseband signals received from a receive signal path of the RF circuitry 1406 and to generate baseband signals for a transmit signal path of the RF circuitry 1406. Baseband circuitry 1404 can interface with the application circuitry 1402 for generation and processing of the baseband signals and for controlling operations of the RF circuitry 1406. For example, in some implementations, the baseband circuitry 1404 can include a 3G baseband processor 1404A, a 4G baseband processor 1404B, a 5G baseband processor 1404C, or other baseband processor(s) 1404D for other existing generations, generations in development or to be developed in the future (e.g., 2G, 6G, etc.). The baseband circuitry 1404 (e.g., one or more of baseband processors 1404A-D) can handle various radio control functions that enable communication with one or more radio networks via the RF circuitry 1406. In other implementations, some or all of the functionality of baseband processors 1404A-D can be included in modules stored in the memory 1404G and executed via a Central Processing Unit (CPU) 1404E. The radio control functions can include, but are not limited to, signal modulation/demodulation, encoding/decoding, radio frequency shifting, etc. In some implementations, modulation/demodulation circuitry of the baseband circuitry 1404 can include Fast-Fourier Transform (FFT), precoding, or constellation mapping/de-mapping functionality. In some implementations, encoding/decoding circuitry of the baseband circuitry 1404 can include convolution, tail-biting convolution, turbo, Viterbi, or Low-Density Parity Check (LDPC) encoder/decoder functionality. Implementations of modulation/demodulation and encoder/decoder functionality are not limited to these examples and can include other suitable functionality in other implementations.

In some implementations, the baseband circuitry 1404 can include one or more audio digital signal processor(s) (DSP) 1404F. The audio DSPs 1404F can include elements for compression/decompression and echo cancellation and can include other suitable processing elements in other implementations. Components of the baseband circuitry can be suitably combined in a single chip, a single chipset, or disposed on a same circuit board in some implementations. In some implementations, some or all of the constituent components of the baseband circuitry 1404 and the application circuitry 1402 can be implemented together such as, for example, on a system on a chip (SOC).

In some implementations, the baseband circuitry 1404 can provide for communication compatible with one or more radio technologies. For example, in some implementations, the baseband circuitry 1404 can support communication with a NG-RAN, an evolved universal terrestrial radio access network (EUTRAN) or other wireless metropolitan area networks (WMAN), a wireless local area network (WLAN), a wireless personal area network (WPAN), etc. Implementations in which the baseband circuitry 1404 is configured to support radio communications of more than one wireless protocol can be referred to as multi-mode baseband circuitry.

RF circuitry 1406 can enable communication with wireless networks using modulated electromagnetic radiation through a non-solid medium. In various implementations, the RF circuitry 1406 can include switches, filters, amplifiers, etc. to facilitate the communication with the wireless network. RF circuitry 1406 can include a receive signal path which can include circuitry to down-convert RF signals received from the FEM circuitry 1408 and provide baseband signals to the baseband circuitry 1404. RF circuitry 1406 can also include a transmit signal path which can include circuitry to up-convert baseband signals provided by the baseband circuitry 1404 and provide RF output signals to the FEM circuitry 1408 for transmission.

In some implementations, the receive signal path of the RF circuitry 1406 can include mixer circuitry 1406A, amplifier circuitry 1406B and filter circuitry 1406C. In some implementations, the transmit signal path of the RF circuitry 1406 can include filter circuitry 1406C and mixer circuitry 1406A. RF circuitry 1406 can also include synthesizer circuitry 1406d for synthesizing a frequency for use by the mixer circuitry 1406A of the receive signal path and the transmit signal path. In some implementations, the mixer circuitry 1406A of the receive signal path can be configured to down-convert RF signals received from the FEM circuitry 1408 based on the synthesized frequency provided by synthesizer circuitry 1406D. The amplifier circuitry 1406B can be configured to amplify the down-converted signals and the filter circuitry 1406C can be a low-pass filter (LPF) or band-pass filter (BPF) configured to remove unwanted signals from the down-converted signals to generate output baseband signals. Output baseband signals can be provided to the baseband circuitry 1404 for further processing. In some implementations, the output baseband signals can be zero-frequency baseband signals, although this is not a requirement. In some implementations, mixer circuitry 1406A of the receive signal path can comprise passive mixers, although the scope of the implementations is not limited in this respect.

In some implementations, the mixer circuitry 1406A of the transmit signal path can be configured to up-convert input baseband signals based on the synthesized frequency provided by the synthesizer circuitry 1406D to generate RF output signals for the FEM circuitry 1408. The baseband signals can be provided by the baseband circuitry 1404 and can be filtered by filter circuitry 1406C.

In some implementations, the mixer circuitry 1406A of the receive signal path and the mixer circuitry 1406A of the transmit signal path can include two or more mixers and can be arranged for quadrature down conversion and up conversion, respectively. In some implementations, the mixer circuitry 1406A of the receive signal path and the mixer circuitry 1406A of the transmit signal path can include two or more mixers and can be arranged for image rejection (e.g., Hartley image rejection). In some implementations, the mixer circuitry 1406A of the receive signal path and the mixer circuitry 1406A can be arranged for direct down conversion and direct up conversion, respectively. In some implementations, the mixer circuitry 1406A of the receive signal path and the mixer circuitry 1406A of the transmit signal path can be configured for super-heterodyne operation.

In some implementations, the output baseband signals, and the input baseband signals can be analog baseband signals, although the scope of the implementations is not limited in this respect. In some alternate implementations, the output baseband signals, and the input baseband signals can be digital baseband signals. In these alternate implementations, the RF circuitry 1406 can include analog-to-digital converter (ADC) and digital-to-analog converter (DAC) circuitry and the baseband circuitry 1404 can include a digital baseband interface to communicate with the RF circuitry 1406.

In some dual-mode implementations, a separate radio IC circuitry can be provided for processing signals for each spectrum, although the scope of the implementations is not limited in this respect.

In some implementations, the synthesizer circuitry 1406D can be a fractional-N synthesizer or a fractional N/N+1 synthesizer, although the scope of the implementations is not limited in this respect as other types of frequency synthesizers can be suitable. For example, synthesizer circuitry 1406D can be a delta-sigma synthesizer, a frequency multiplier, or a synthesizer comprising a phase-locked loop with a frequency divider.

The synthesizer circuitry 1406D can be configured to synthesize an output frequency for use by the mixer circuitry 1406A of the RF circuitry 1406 based on a frequency input and a divider control input. In some implementations, the synthesizer circuitry 1406D can be a fractional N/N+1 synthesizer.

In some implementations, frequency input can be provided by a voltage-controlled oscillator (VCO), although that is not a requirement. Divider control input can be provided by either the baseband circuitry 1404 or the applications circuitry 1402 depending on the desired output frequency. In some implementations, a divider control input (e.g., N) can be determined from a look-up table based on a channel indicated by the applications circuitry 1402.

Synthesizer circuitry 1406D of the RF circuitry 1406 can include a divider, a delay-locked loop (DLL), a multiplexer and a phase accumulator. In some implementations, the divider can be a dual modulus divider (DMD) and the phase accumulator can be a digital phase accumulator (DPA). In some implementations, the DMD can be configured to divide the input signal by either N or N+1 (e.g., based on a carry out) to provide a fractional division ratio. In some example implementations, the DLL can include a set of cascaded, tunable, delay elements, a phase detector, a charge pump and a D-type flip-flop. In these implementations, the delay elements can be configured to break a VCO period up into Nd equal packets of phase, where Nd is the number of delay elements in the delay line. In this way, the DLL provides negative feedback to help ensure that the total delay through the delay line is one VCO cycle.

In some implementations, synthesizer circuitry 1406D can be configured to generate a carrier frequency as the output frequency, while in other implementations, the output frequency can be a multiple of the carrier frequency (e.g., twice the carrier frequency, four times the carrier frequency) and used in conjunction with quadrature generator and divider circuitry to generate multiple signals at the carrier frequency with multiple different phases with respect to each other. In some implementations, the output frequency can be a LO frequency (fLO). In some implementations, the RF circuitry 1406 can include an IQ/polar converter.

FEM circuitry 1408 can include a receive signal path which can include circuitry configured to operate on RF signals received from one or more antennas 1410, amplify the received signals and provide the amplified versions of the received signals to the RF circuitry 1406 for further processing. FEM circuitry 1408 can also include a transmit signal path which can include circuitry configured to amplify signals for transmission provided by the RF circuitry 1406 for transmission by one or more of the one or more antennas 1410. In various implementations, the amplification through the transmit or receive signal paths can be done solely in the RF circuitry 1406, solely in the FEM circuitry 1408, or in both the RF circuitry 1406 and the FEM circuitry 1408.

In some implementations, the FEM circuitry 1408 can include a TX/RX switch to switch between transmit mode and receive mode operation. The FEM circuitry can include a receive signal path and a transmit signal path. The receive signal path of the FEM circuitry can include an LNA to amplify received RF signals and provide the amplified received RF signals as an output (e.g., to the RF circuitry 1406). The transmit signal path of the FEM circuitry 1408 can include a power amplifier (PA) to amplify input RF signals (e.g., provided by RF circuitry 1406), and one or more filters to generate RF signals for subsequent transmission (e.g., by one or more of the one or more antennas 1410).

In some implementations, the PMC 1412 can manage power provided to the baseband circuitry 1404. In particular, the PMC 1412 can control power-source selection, voltage scaling, battery charging, or DC-to-DC conversion. The PMC 1412 can often be included when the device 1400 is capable of being powered by a battery, for example, when the device is included in a UE. The PMC 1412 can increase the power conversion efficiency while providing desirable implementation size and heat dissipation characteristics.

While FIG. 14 shows the PMC 1412 coupled only with the baseband circuitry 1404. In other implementations, the PMC 1412 may be additionally or alternatively coupled with, and perform similar power management operations for, other components such as, but not limited to, application circuitry 1402, RF circuitry 1406, or FEM circuitry 1408.

In some implementations, the PMC 1412 can control, or otherwise be part of, various power saving mechanisms of the device 1400. For example, if the device 1400 is in an RRC_Connected state, where it is still connected to the RAN node as it expects to receive traffic shortly, then it can enter a state known as Discontinuous Reception Mode (DRX) after a period of inactivity. During this state, the device 1400 can power down for brief intervals of time and thus save power.

If there is no data traffic activity for an extended period of time, then the device 1400 can transition off to an RRC_Idle state, where it disconnects from the network and does not perform operations such as channel quality feedback, handover, etc. The device 1400 goes into a very low power state and it performs paging where again it periodically wakes up to listen to the network and then powers down again. The device 1400 may not receive data in this state; in order to receive data, it can transition back to RRC_Connected state.

An additional power saving mode can allow a device to be unavailable to the network for periods longer than a paging interval (ranging from seconds to a few hours). During this time, the device is totally unreachable to the network and can power down. Any data sent during this time incurs a large delay and it is assumed the delay is acceptable.

Processors of the application circuitry 1402 and processors of the baseband circuitry 1404 can be used to execute elements of one or more instances of a protocol stack. For example, processors of the baseband circuitry 1404, alone or in combination, can be used execute Layer 3, Layer 2, or Layer 1 functionality, while processors of the baseband circuitry 1404 can utilize data (e.g., packet data) received from these layers and further execute Layer 4 functionality (e.g., transmission communication protocol (TCP) and user datagram protocol (UDP) layers). As referred to herein, Layer 3 can comprise a RRC layer, described in further detail below. As referred to herein, Layer 2 can comprise a medium access control (MAC) layer, a radio link control (RLC) layer, and a packet data convergence protocol (PDCP) layer, described in further detail below. As referred to herein, Layer 1 can comprise a physical (PHY) layer of a UE/RAN node, described in further detail below.

Figure 15:
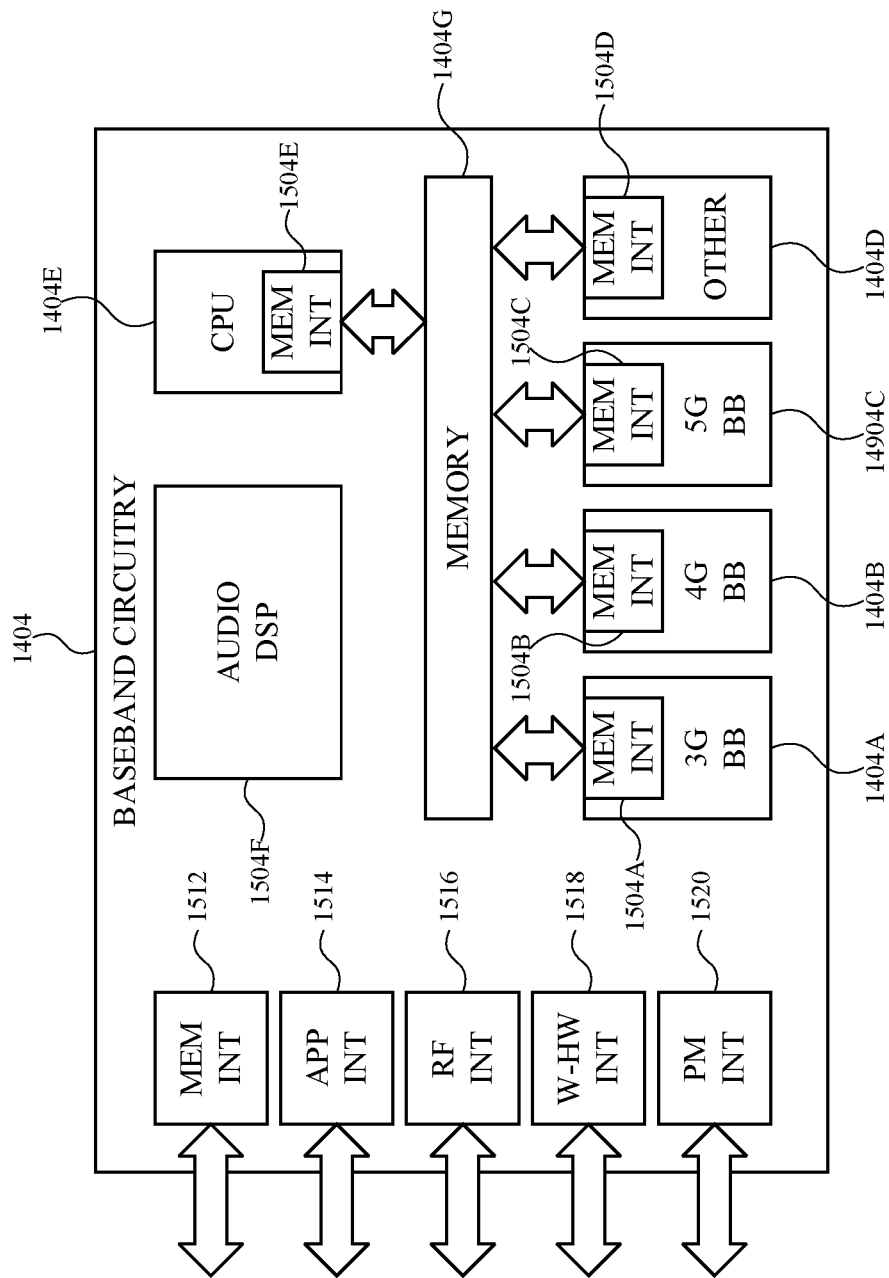
FIG. 15 is a diagram of example interfaces of baseband circuitry according to one or more implementations described herein.

FIG. 15 is a diagram of example interfaces of baseband circuitry according to one or more implementations described herein. As discussed above, the baseband circuitry 1404 of FIG. 14 can comprise processors 1404A-1404E and a memory 1404G utilized by said processors. Each of the processors 1404A-1404E can include a memory interface, 1504A-1504E, respectively, to send/receive data to/from the memory 1404G.

The baseband circuitry 1404 can further include one or more interfaces to communicatively couple to other circuitries/devices, such as a memory interface 1412 (e.g., an interface to send/receive data to/from memory external to the baseband circuitry 1404), an application circuitry interface 1514 (e.g., an interface to send/receive data to/from the application circuitry 1402 of FIG. 14), an RF circuitry interface 1516 (e.g., an interface to send/receive data to/from RF circuitry 1406 of FIG. 14), a wireless hardware connectivity interface 1518 (e.g., an interface to send/receive data to/from Near Field Communication (NFC) components, Bluetooth® components (e.g., Bluetooth® Low Energy), Wi-Fi® components, and other communication components), and a power management interface 1520 (e.g., an interface to send/receive power or control signals to/from the PMC 1412).

Examples herein can include subject matter such as a method, means for performing acts or blocks of the method, at least one machine-readable medium including executable instructions that, when performed by a machine (e.g., a processor (e.g., processor, etc.) with memory, an application-specific integrated circuit (ASIC), a field programmable gate array (FPGA), or the like) cause the machine to perform acts of the method or of an apparatus or system for concurrent communication using multiple communication technologies according to implementations and examples described.

In example 1, which may also include one or more of the example described herein, a baseband processor of a user equipment (UE) may comprise: one or more processors configured to: receive, from a serving base station, network configuration information indicating synchronization signal blocks (SSBs) on a carrier of a target base station; communicate, to the serving base station and in response to the network configuration information, that the UE is capable of gapless measurement on the target base station; when the SSBs of the target base station and signaling from the serving base station have different numerologies, communicate, to the serving base station, support for concurrent reception of the SSBs of the target base station and signaling from serving cell; receive SSBs of the target base station and signaling from the serving base station; and report measurement results of SSBs to serving base station.

In example 2, which may also include one or more of the examples described herein, the UE communicates support for concurrent reception of the SSBs of the target base station and physical downlink control channel (PDCCH) and physical downlink shared channel (PDSCH) signaling from the serving base station. In example 3, which may also include one or more of the examples described herein, the UE communicates support for concurrent inter-frequency reception of the SSBs of the target base station and PDCCH/PDSCH signaling from the serving base station regardless of whether the SSBs and PDCCH/PDSCH comprise inter-band signaling or intra-band signaling. In example 4, which may also include one or more of the examples described herein, the UE communicates support for concurrent intra-band inter-frequency reception of the SSBs of the target base station and PDCCH/PDSCH signaling of the serving base station.

In example 5, which may also include one or more of the examples described herein, the UE communicates support for concurrent inter-band inter-frequency reception of the SSBs of the target base station and PDCCH/PDSCH signaling of the serving base station. In example 6, which may also include one or more of the examples described herein, the UE receives PDCCH/PDSCH scheduling during measurement of the SSBs of the target base station. In example 7, which may also include one or more of the examples described herein, the UE communicates support for concurrent reception the SSBs of the target base station and SSBs and a channel state information (CSI) reference signal (RS) (CSI-RS) signaling of the serving base station.

In example 8, which may also include one or more of the examples described herein, the UE communicates support for concurrent inter-frequency reception of the SSBs of the target base station and the SSBs and CSI-RS of the serving base station regardless of whether the SSBs of the target base station and the SSBs and CSI-RS of the serving base station comprise inter-band signaling or intra-band signaling. In example 9, which may also include one or more of the examples described herein, the UE communicates support for concurrent inter-band inter-frequency reception of the SSBs of the target base station and the SSBs and CSI-RS of the serving base station. In example 10, which may also include one or more of the examples described herein, the UE concurrently measures the SSBs of the target base station and the SSBs and CSI-RS of the serving base station.

In example 10, which may also include one or more of the examples described herein, a user equipment (UE) may be configured to receive, from a serving base station, network configuration information indicating synchronization signal blocks (SSBs) on a carrier of a target base station; communicate, to the serving base station and in response to the network configuration information, that the UE is capable of gapless measurement on the target base station; when the SSBs of the target base station and signaling from the serving base station have different numerologies, communicate, to the serving base station, support for concurrent reception of the SSBs of the target base station and signaling from serving cell; receive SSBs of the target base station and signaling from the serving base station; and report measurement results of SSBs to serving base station.

In example 10, which may also include one or more of the examples described herein, a method performed by a user equipment (UE), the comprising: receiving, from a serving base station, network configuration information indicating synchronization signal blocks (SSBs) on a carrier of a target base station; communicating, to the serving base station and in response to the network configuration information, that the UE is capable of gapless measurement on the target base station; when the SSBs of the target base station and signaling from the serving base station have different numerologies, communicating, to the serving base station, support for concurrent reception of the SSBs of the target base station and signaling from serving cell; receiving SSBs of the target base station and signaling from the serving base station; and reporting measurement results of SSBs to serving base station.

The above description of illustrated examples, implementations, aspects, etc., of the subject disclosure, including what is described in the Abstract, is not intended to be exhaustive or to limit the disclosed aspects to the precise forms disclosed. While specific examples, implementations, aspects, etc., are described herein for illustrative purposes, various modifications are possible that are considered within the scope of such examples, implementations, aspects, etc., as those skilled in the relevant art can recognize.

In this regard, while the disclosed subject matter has been described in connection with various examples, implementations, aspects, etc., and corresponding Figures, where applicable, it is to be understood that other similar aspects can be used or modifications and additions can be made to the disclosed subject matter for performing the same, similar, alternative, or substitute function of the subject matter without deviating therefrom. Therefore, the disclosed subject matter should not be limited to any single example, implementation, or aspect described herein, but rather should be construed in breadth and scope in accordance with the appended claims below.

In particular regard to the various functions performed by the above described components or structures (assemblies, devices, circuits, systems, etc.), the terms (including a reference to a "means") used to describe such components are intended to correspond, unless otherwise indicated, to any component or structure which performs the specified function of the described component (e.g., that is functionally equivalent), even though not structurally equivalent to the disclosed structure which performs the function in the herein illustrated exemplary implementations. In addition, while a particular feature may have been disclosed with respect to only one of several implementations, such feature may be combined with one or more other features of the other implementations as may be desired and advantageous for any given or particular application.

As used herein, the term "or" is intended to mean an inclusive "or" rather than an exclusive "or". That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form. Furthermore, to the extent that the terms "including", "includes", "having", "has", "with", or variants thereof are used in either the detailed description and the claims, such terms are intended to be inclusive in a manner similar to the term "comprising." Additionally, in situations wherein one or more numbered items are discussed (e.g., a "first X", a "second X", etc.), in general the one or more numbered items can be distinct, or they can be the same, although in some situations the context may indicate that they are distinct or that they are the same.

It is well understood that the use of personally identifiable information should follow privacy policies and practices that are generally recognized as meeting or exceeding industry or governmental requirements for maintaining the privacy of users. In particular, personally identifiable information data should be managed and handled so as to minimize risks of unintentional or unauthorized access or use, and the nature of authorized use should be clearly indicated to users.

What is claimed is:

1. A baseband processor of a user equipment (UE), comprising:
    one or more processors configured to
        receive, from a serving base station, network configuration information indicating synchronization signal blocks (SSBs) on a carrier of a target base station;
        in response to the network configuration information, cause transmission of first information to the serving base station that indicates that the UE is capable of gapless measurement on the target base station;
        when the SSBs of the target base station and SSBs from the serving base station have different numerologies, cause transmission of second information to the serving base station that indicates, on a per radio frequency range, per frequency band, or per broadcast basis, support for concurrent reception of the SSBs of the target base station and SSBs from the serving base station;
        receive SSBs of the target base station and SSBs from the serving base station; and
        report measurement results of the SSBs to the serving base station.

2. The baseband processor of claim 1, wherein the one or more processors are configured to, when SSBs of the serving base station are in an active bandwidth part (BWP) and SSBs of the target base station are in a different BWP,
    during concurrent SSB bursts of the serving base station and the target base station, extend the active BWP to include the active and the different BWP; and
    reset the active BWP after the concurrent SSB bursts.

3. The baseband processor of claim 2, wherein the second information indicates support for concurrent intra-band inter-frequency reception of the SSBs of the target base station and SSBs of the serving base station.

4. The baseband processor of claim 2, wherein the one or more processors are configured to receive the SSBs of the serving base station and the SSBs of the target base station from a same radio frequency (RF) chain of the UE.

5. The baseband processor of claim 1, wherein the one or more processors are configured to, when SSBs of the serving base station are in an active bandwidth part (BWP) and SSBs of the target base station are in a different BWP,
    during concurrent SSB bursts of the serving base station and the target base station, receive the SSBs of the serving base station from a first RF chain of the UE and receive the SSBs of the target base station from a second RF chain of the UE.

6. The baseband processor of claim 5, wherein the second information indicates support for concurrent inter-band inter-frequency reception of the SSBs of the target base station and SSBs of the serving base station.

7. A user equipment (UE), comprising:
radio frequency (RF) circuitry; and
baseband circuitry coupled to the RF circuitry, the baseband circuitry including memory coupled to one or more processors configured to, when executing instructions stored in the memory
receive, from a serving base station, network configuration information indicating synchronization signal blocks (SSBs) on a carrier of a target base station;
in response to the network configuration information, control the RF circuitry to cause transmission of first information to the serving base station that indicates that the UE is capable of gapless measurement on the target base station;
when the SSBs of the target base station and SSBs from the serving base station have different numerologies, control the RF circuitry to cause transmission of second information to the serving base station that indicates, on a per radio frequency range, per frequency band, or per broadcast basis, support for concurrent reception of the SSBs of the target base station and SSBs from the serving base station;
receive SSBs of the target base station and SSBs from the serving base station; and
control the RF circuitry to cause transmission of measurement results of the SSBs to the serving base station.

8. The UE of claim 7, wherein the one or more processors are configured to, when SSBs of the serving base station are in an active bandwidth part (BWP) and SSBs of the target base station are in a different BWP,
during concurrent SSB bursts of the serving base station and the target base station, extend the active BWP to include the active and the different BWP; and
reset the active BWP after the concurrent SSB bursts.

9. The UE of claim 8, wherein the second information indicates support for concurrent intra-band inter-frequency reception of the SSBs of the target base station and SSBs of the serving base station.

10. The UE of claim 8, wherein the one or more processors are configured to receive the SSBs of the serving base station and the SSBs of the target base station from a same radio frequency (RF) chain of the UE.

11. The UE of claim 7, wherein the one or more processors are configured to, when SSBs of the serving base station are in an active bandwidth part (BWP) and SSBs of the target base station are in a different BWP, during concurrent SSB bursts of the serving base station and the target base station, receive the SSBs of the serving base station from a first RF chain of the UE and receive the SSBs of the target base station from a second RF chain of the UE.

12. A method, comprising:
receiving, from a serving base station, network configuration information indicating synchronization signal blocks (SSBs) on a carrier of a target base station;
communicating, to the serving base station and in response to the network configuration information, that a user equipment (UE), is capable of gapless measurement on the target base station;
when the SSBs of the target base station and SSBs from the serving base station have different numerologies,
communicating, to the serving base station, support for concurrent reception of the SSBs of the target base station and SSBs from the serving base station on a per radio frequency range, per frequency band, or per broadcast basis;
receiving SSBs of the target base station and SSBs from the serving base station; and
reporting measurement results of the SSBs to the serving base station.

13. The method of claim 12, further comprising, when SSBs of the serving base station are in an active bandwidth part (BWP) and SSBs of the target base station are in a different BWP,
extending the active BWP to include the active and the different BWP during concurrent SSB bursts of the serving base station and the target base station; and
resetting the active BWP after the concurrent SSB bursts.

14. The method of claim 13, further comprising communicating support for concurrent intra-band inter-frequency reception of the SSBs of the target base station and SSBs of the serving base station.

15. The method of claim 13, further comprising receiving the SSBs of the serving base station and the SSBs of the target base station from a same radio frequency (RF) chain of the UE.

16. The method of claim 12, further comprising, when SSBs of the serving base station are in an active bandwidth part (BWP) and SSBs of the target base station are in a different BWP,
during concurrent SSB bursts of the serving base station and the target base station, receiving the SSBs of the serving base station from a first RF chain of the UE and receiving the SSBs of the target base station from a second RF chain of the UE.

* * * * *